(12) United States Patent
Gilder et al.

(10) Patent No.: US 8,560,568 B2
(45) Date of Patent: Oct. 15, 2013

(54) REMOTE DATA COLLECTION SYSTEMS AND METHODS USING READ ONLY DATA EXTRACTION AND DYNAMIC DATA HANDLING

(75) Inventors: Clark S. Gilder, Alpharetta, GA (US); Joshua Hix, New York, NY (US); Bartosz J. Zalewski, Ellijay, GA (US)

(73) Assignee: ZeeWise, Inc., Atlanta, GA (US)

( * ) Notice: Subject to any disclaimer, the term of this patent is extended or adjusted under 35 U.S.C. 154(b) by 0 days.

(21) Appl. No.: 13/540,415

(22) Filed: Jul. 2, 2012

(65) Prior Publication Data

US 2013/0173539 A1 Jul. 4, 2013

Related U.S. Application Data

(63) Continuation-in-part of application No. 12/547,788, filed on Aug. 26, 2009, now Pat. No. 8,214,329.

(60) Provisional application No. 61/136,291, filed on Aug. 26, 2008.

(51) Int. Cl.
*G06F 17/30* (2006.01)

(52) U.S. Cl.
USPC ........... 707/770; 707/602; 707/796; 707/736; 709/201; 709/203; 709/217

(58) Field of Classification Search
USPC .......... 707/602, 796, 736, 770; 709/201, 203, 709/217
See application file for complete search history.

(56) References Cited

U.S. PATENT DOCUMENTS

| | | | | |
|---|---|---|---|---|
| 4,930,071 A | * | 5/1990 | Tou et al. | 1/1 |
| 5,317,729 A | * | 5/1994 | Mukherjee et al. | 1/1 |
| 5,689,698 A | * | 11/1997 | Jones et al. | 1/1 |
| 5,873,083 A | * | 2/1999 | Jones et al. | 1/1 |
| 6,012,067 A | * | 1/2000 | Sarkar | 1/1 |
| 6,226,651 B1 | | 5/2001 | Masuda et al. | |
| 6,263,330 B1 | * | 7/2001 | Bessette | 1/1 |
| 6,615,253 B1 | | 9/2003 | Bowman-Amuah | |
| 6,813,617 B2 | * | 11/2004 | Wong et al. | 1/1 |
| 6,820,082 B1 | * | 11/2004 | Cook et al. | 707/754 |
| 7,171,413 B2 | * | 1/2007 | Puz et al. | 1/1 |
| 7,321,939 B1 | | 1/2008 | Porter | |
| 7,924,730 B1 | | 4/2011 | McAllister et al. | |

(Continued)

OTHER PUBLICATIONS

International Search Report and Written Opinion issued in Application No. PCT/US 10/41777 on Sep. 27, 2010. p. 3.

*Primary Examiner* — Frantz Coby
(74) *Attorney, Agent, or Firm* — Clements Bernard PLLC; Lawrence A. Baratta, Jr.; Christopher L. Bernard

(57) ABSTRACT

Remote data collection systems and methods retrieve data including financial, sales, marketing, operational and the like data from a plurality of databases and database types remotely over a network in an automated, platform-agnostic manner. A remote data collection system includes a network interface, a connection to a data source, a processor communicatively coupled to the network interface and the connection, and memory storing instructions for remote data collection that, when executed, cause the processor to: receive a request to extract data from the data source; extract the data in a non-intrusive manner from the data source using a two phase process comprising a reconciliation phase and a collection phase; and transmit one of an entire set and a subset of the extracted data based on the request.

19 Claims, 26 Drawing Sheets

(56) References Cited

U.S. PATENT DOCUMENTS

| | | |
|---|---|---|
| 8,214,329 B2 * | 7/2012 | Gilder et al. ................. 707/622 |
| 2002/0156792 A1 * | 10/2002 | Gombocz et al. ............. 707/100 |
| 2005/0050046 A1 * | 3/2005 | Puz et al. ......................... 707/9 |
| 2005/0086176 A1 * | 4/2005 | Dahlgren et al. ............... 705/64 |
| 2005/0108523 A1 | 5/2005 | West |
| 2005/0216421 A1 | 9/2005 | Barry et al. |
| 2006/0053183 A1 | 3/2006 | Eaton et al. |
| 2007/0168346 A1 * | 7/2007 | Markanthony et al. ........... 707/6 |
| 2007/0168461 A1 | 7/2007 | Moore |
| 2008/0016146 A1 | 1/2008 | Gan et al. |
| 2010/0011074 A1 | 1/2010 | Billingsley et al. |
| 2010/0179940 A1 * | 7/2010 | Gilder et al. .................. 707/622 |

* cited by examiner

─800

A Collection Schedule:
(retrieved from the Full Collection Definition Object)

StartTime: time and day of first scheduled launch

RepeatRateMinutes: interval in minutes to repeat launch at

Iterations: infiite, none, or specific number of times to repeat launch

CollectionType: what type of CollectionTask to launch (Database, Quickbooks, other)

useTrayApp: whether particular client has a tray integration

*FIG. 8*

Data Message Sender implementation objects

| Object Name or ID | Description | Usage |
|---|---|---|
| Data Message Sender (DMS) | Encapsulates logic for packaging collected data into "data messages" | Base class for sending generic 'data' |
| Data Row Sender | Handles row-based data | Class for sending row based data |
| QuickBooks Message Sender | Special handler for QBXML data | Class for sending QBXML based data |
| Table Data Sender | Handles database table metadata | Class for sending data formatted in rows and columns |

*FIG. 12*

Collection Definition Object

| Object Name or ID | Description | Sample |
|---|---|---|
| Collection Table | Represents collection LOB database structure / schema | LOB Tables |
| Collection Column | Represents collection LOB database structure / schema | LOB Columns |
| Database Info | DB specific "driver" information | Supports stored procedures, unsupported data types, etc. |
| Schedule | Time and frequency to collect data | Every day at 12:00 |
| Data Source Connection | LOB data source connection configuration definition | JDBC driver connection string, or path to source DB file name |

*FIG. 15*

REMOTE DATA COLLECTION SYSTEMS AND METHODS USING READ ONLY DATA EXTRACTION AND DYNAMIC DATA HANDLING

CROSS-REFERENCE TO RELATED APPLICATION(S)

The present non-provisional patent application is a continuation-in-part of U.S. Pat. No. 8,214,329, filed Aug. 26, 2009, issued on Jul. 3, 2012, and entitled "REMOTE DATA COLLECTION SYSTEMS AND METHODS," which claims priority to U.S. Provisional Patent Application Ser. No. 61/136,291, filed Aug. 26, 2008, entitled "REMOTE DATA COLLECTION SYSTEM," each of which is incorporated in full by reference herein.

FIELD OF THE INVENTION

The present invention relates generally to remote data collection. More particularly, the present invention provides remote data collection systems and methods for retrieving data from one or more databases such as financial, sales, marketing, operational and the like data from a plurality of database types at a plurality of remote locations over a network in an automated, platform-agnostic manner.

BACKGROUND OF THE INVENTION

Franchising is an approach to doing business whereby the owner of a business concept (i.e., a Franchisor) licenses the business model to an independent business entity (i.e., a Franchisee) to operate under the terms of a well defined franchise agreement. The Franchisor authorizes the usage of proven trade dress, operating methods and systems as well as business practices within the guidelines set forth in the agreement. The Franchisor provides various support services that can include advertising/marketing/public relations, training, operating/physical facility design assistance, product/menu specifications, materials sourcing support, production and operating systems design including Line of Business (LOB) applications, Point of Sales (POS) systems and/or other business support. Such support is generally provided to the Franchisee for a royalty fee calculated as a percentage of gross monthly sales which the Franchisee typically faxes or emails to the Franchisor on a monthly basis. In the US, as of 2005, the franchising business model was utilized in over 70 different industry segments by 2,500 Franchisors with over 900,000 individual franchisee locations generating more than $1 trillion in revenues. An LOB application is one of the set of critical computer applications that are vital to running a business, such as production, operations, accounting, supply chain management, resource planning applications, and the like. LOB applications are usually specialized programs that contain a number of integrated capabilities which tie into and depend upon the features of databases and database management systems to store, retrieve and manage critical transaction and business data.

Franchisors have a fiduciary legal obligation to support the franchisees in their efforts to successfully operate the concept. Unfortunately, Franchisors typically struggle to know how their Franchisees are performing as it is very difficult to collect, consolidate and report on the key operational and financial indicators for each of the Franchisees. At least one known reason for this difficulty is because many of these individual Franchisees utilize different operational and financial reporting systems that cannot be easily collected from, consolidated or reported upon due to their different data storage formats, different product versions or non-standardized product deployment. As a result, Franchisors are often left to advise Franchisees on how to improve their business and operational performance with very limited data and they lack the ability to compare them to peer groups and or regional norms within the concept or industry. Additionally, while most businesses and business consultants desire to identify operational Key Performance Indicators (KPI), having limited data makes it difficult to identify and monitor them.

While Franchising is one example of an industry that can utilize a remote data collection system, there are many other industries or business models which can benefit from a remote data collection system. Other examples include trade associations, co-operatives, or distributors but can also include branch or field offices of large corporate enterprises. Another example is a bank or credit provider who desires to monitor the financial health of one or more businesses to which they make loans or to whom they extend lines of credit which can be tied to financial measurements such as accounts receivable (AR), cash flow or profitability. Typically, businesses who desire to remotely monitor the financial or operational parameters of a business depend on emailed or faxed copies of monthly, quarterly or year-end reports which are often lost, ignored or obsolete by the time they are received or reviewed. In addition, these reports are inadequate to monitor dynamic business conditions and certainly cannot provide monitoring in a near real time and consolidated manner without extensive customized Information Technology (IT) systems and support personnel. In general, the problem and challenges of remote data collection can be seen to apply to any and all business with multiple locations where POS or LOB applications operate and where the need to monitor these businesses requires access to the data from each location in a consolidated or "rolled up" fashion.

In at least some known techniques of collecting operational or business data, collection features embedded into a single LOB application such as a POS system are generally standardized across all remote sites. That is, if a Franchisor wishes to collect each day's sales and transaction detail information from all of the remote stores operating in their franchise system, they must first standardize every store on the exact same POS system vendor (if not the exact same version of that POS application). This standardization is required to enable the system to roll up and consolidate the data from identical copies of the application database along with identical transaction detail format which is stored in the same type and version level of the database. Additionally, many of these single version collection systems depend on data consolidation systems that are built into the database engine which is used to store (electronically read/write to a disk) the data at the remote sites. Database vendors such as Microsoft, Oracle, and Sybase have provided many types of proprietary "data replication" techniques embedded into their products to allow Independent Software Vendors (ISVs) to develop rich LOB applications (e.g. POS) that can copy and replicate identical databases to a central location via their built-in techniques or Application Programming Interfaces (API). The fact that a business must standardize their POS system on a single POS vendor and version to enable remote data consolidation is a limitation which is often driven by the fact that the POS system was built on top of a database vendor's replication technology which only "talks" to itself.

Previous custom IT solutions to these challenges utilized data replication techniques which required the development of custom software using proprietary tools and technologies. While database or software tool vendors have provided remote data replication techniques for many years, these techniques are limited to being used on themselves: e.g., a single database vendors API and replication system can be used to build a single LOB application (ex. a CRM system or a POS) which only collects and consolidates remote data from of the same LOB type and version level. These techniques do not allow for a generic process which works both across LOB applications and across database vendors in a simplified and automated, lights out manner. Additionally, while traditional "middleware" message bus (or message queuing) architectures have been used by large enterprise businesses to replicate data between two independent LOB systems, these implementations require a consistent set of centrally managed and expensive IT infrastructure (such as integrated security models, managed firewall ports or private networks, and dedicated servers). Thus, businesses desiring to replicate data from multiple remote sites or multiple LOB systems must either standardize on one database or middleware vendor and or provide extensive IT development and support at every site.

Alternative techniques to replicate data depend on a common definition of the data and or a common data file format. While there are many industry standards for "data interoperability" (such as XML standards, CSV text files, or other formats) these standards only enable a common data description and data format to be used when "exporting" data from within the original LOB system, they do not solve the data transport problem. Thus additional communication technologies such as the Internet File Transfer Protocol (FTP) or Message Queuing products from Tibco, IBM, Oracle/BEA, and others must be used. Or alternatively, custom software can be written that utilizes the new Web Services communication standards to "transport" the common data formatted file to a central location. The challenge to using these techniques to create a centralized and automated remote data consolidation system is the fact that they require software customization to adapt them to each LOB product and version as well as require extensive IT personnel to support the communication infrastructure on both sides of the communication channel. In addition, these methods depend on having every LOB application support the same common file format as a "data export" option. An additional requirement may be present when data from different LOB applications is collected into a central data warehouse or repository which then requires that extensive "data transformation" techniques be used to normalize the data into a common format. These conditions or requirements cannot be easily supported by small or mid-size businesses (ex. Franchisors) or these conditions do not exist uniformly across various remote businesses. This fact is particularly true for remote sites where the local personnel may not be employees of the business which seeks to centralize the data (ex. Franchisees) and thus they are unfamiliar with, untrained on or unwilling to follow detailed operational guidelines and procedures to extract LOB data from their local system into a common data file and send it across a sophisticated communication infrastructure.

An additional challenge to automated collection of remote LOB data is the problem of systems administration and management. For any system to work, it must have a process to uniquely identify a location and the specific "rules" required by the local system agent to operate autonomously at the location. This identification and control scheme must handle variations and changes in business operating rules, naming conventions, organizational structure (regions, attributes, reporting rules, etc) and other collection and consolidation rule requirements such as versioning of code and databases. Additionally, the systems management model must provide for flexibility in targeting, controlling, monitoring and reporting on the state of the remote sites while the data collection process dynamically operates on a 24×7×365 manner. Beyond the technical barriers, many remote data collection systems fail due to the overhead and complexity of simply managing remote software agents at hundreds or even thousands of remote physical locations. Finally, the communication method utilized to connect the remote sites to a central consolidation point must be easy and operate in a "lights out" manner in order to efficiently scale the management, monitoring and system control while providing for fault tolerance, reliability and guaranteed delivery of remote data to the central site.

Thus, any business which desires to have a consolidated view of LOB data across many remote sites must either provide IT support personnel, or create a custom software program that is so simple that anyone can operate it without extensive training on consistent procedures. What is desired by various businesses is a generic remote data consolidation system which can be quickly and easily adapted to their LOB system without extensive and costly custom programming. This generic system must then work across any type of remote location and work across various LOB application and database vendors as well as multiple databases or LOB applications at a single remote site. Such a system would then need to be quickly deployed to many remote sites without remote IT personnel, work flexibly and yet dynamically, reliably and automatically collect data from one or more various LOB applications and send the data across a common communication infrastructure such as TCP/IP and the Internet.

BRIEF SUMMARY OF THE INVENTION

In various exemplary embodiments, the present invention provides remote data collection systems and methods for retrieving data such as financial, sales, marketing, operational and the like data from a plurality of database types remotely over a network in an automated, platform-agnostic manner. The present invention is designed to work across LOB application, across database vendors and across business models or businesses, as well as business infrastructure (various computing and POS devices) and business processes while still providing the centralized ability to automatically collect data from multiple remote business sites. The present invention includes one or more central servers communicating with a plurality of remote data collection agents. The remote data collection agent is designed to overcome existing requirements or limitations as it is able to automatically collect remote data from a wide range of businesses, as well as multiple LOB applications while connecting to multiple databases vendors and formats over a manageable, configurable transport mechanism included in the present invention.

The remote data consolidation process of the present invention is flexible, yet comprehensive and complete while allowing for variability, complexity and individual requirements of a variety of LOB applications running in a variety of situations at remote sites. The unique and novel design features and attributes provide these capabilities and allow a central administrator to dynamically define what data to collect and how to collect it from a variety of remote LOB applications and database formats, across many sites without developing custom program code and without local IT help while yielding a central consolidated view of the entire business operation. Additional flexibility is shown through the use of optional LOB add-in components or local UI components to alert remote site personnel and allow them to be part of the automated process along with an optional deployment of the consolidation database server at a customer's site. As a result, the remote data collection system provides a centralized database from which management reports, executive dashboards and monitoring can be performed to increase the efficiency, effectiveness and overall profitability of these remote sites while also allowing for increased visibility into the underperforming sites and enabling proactive support to be provided to them before it is too late. This is accomplished by the client agent and server design, the use of definitions and updates, along with a central management approach without the need for expensive and scarce remote IT people.

The flexibility of the present invention is derived from a foundation built on top of an abstract message passing architecture, plus the use of "metadata" messages to dynamically control and configure the agent along with a layered code design which allows for the replacement of code layers without disruption or reinstallation of the entire system. The key to the lights-out remote control and operation of the system is due to the use of an automated installation package, plus a set of system metadata messages which define and control what to do at the remote agent once it is installed along with a centralized logging, error handling and alerting system via the same message infrastructure as the data collection. This architecture allows the entire system to be centrally managed and monitored over the same message communication infrastructure which is used to collect remote data. The metadata messages are built from a configuration database which defines both the system "definition rules" and the client agent "update versions". The system also uses messages to provide for a centralized log of all remote agent state or status. Definitions are records which store the collection rules which tell the remote client agent what to do, how to do it and when to do it for one or more LOB applications operating at the remote site or groups of sites. Using the existing data replication system, system definitions and update files can be sent out to the remote sites to update the existing agent code and reconfigure the collection process. Thus, the overall unique and novel system characteristics of quick adaptability, flexibility and performance is due to many unique factors including but not limited to the combination of the system architecture, remote agent and server design, along with the metadata control and management system. This flexibility is required in order to easily adapt the system across the wide range of business conditions, various LOB applications and databases as part of an automated remote data collection system which does not require remote personnel support to operationally scale across thousands of remote sites.

In an exemplary embodiment, a remote data collection system includes a network interface; a connection to a data source; a processor communicatively coupled to the network interface and the connection; and memory storing instructions for remote data collection that, when executed, cause the processor to: receive a request to extract data from the data source; extract the data in a non-intrusive manner from the data source using a two phase process comprising a reconciliation phase and a collection phase; and transmit one of an entire set and a subset of the extracted data based on the request. The non-intrusive manner can include the data source being read only to the processor during the remote data collection. The instructions, when executed, further cause the processor to: copy the data from the data source to a shadow database; and process the data in the shadow database to provide the entire set and the subset of the extracted data. The data source is read only to the processor during the remote data collection. The shadow database is separate from the data source, and wherein the non-intrusive manner utilizes the shadow database for any insertions, updates, or deletions thereby preventing any interference, corruption, or modification of the data source by the processor during the remote data collection. The instructions, when executed, further cause the processor to: mark data stored in the shadow database with metadata to distinguish between existing data, modified data, deleted data, or new data, in order to facilitate the remote data collection process. The instructions, when executed, further cause the processor to: create the shadow database based on database schema, tables, and columns defined by the current collection object for the data source; wherein the shadow database is adapted to a type associated with the data source thereby enabling the remote data collection to operate on a plurality of software, systems, and data files for obtaining extractable data therefrom. The data source can include one of a text file, a spreadsheet, a structured query language database, an Indexed Sequential Access Method file, and a flat file. The instructions, when executed, further cause the processor to: perform peer-to-peer ad hoc dynamic data replication and synchronization with a remote data system; and utilize a dynamic command language with the remote data system to determine what data sets to retrieve, how to extract the data sets, and compare extracted data to targeted or requested data. The instructions, when executed, further cause the processor to: perform the reconciliation phase to determine what data to extract from the data source, to determine how to extract the data from the data source, and to define a current collection object for extracting the data from the data source; and perform the collection phase to synchronize data between the data source and the shadow database, to process the data in the shadow database, and to send the processed data.

In another exemplary embodiment, a remote data collection method includes receiving a request for remote data collection to extract data from a data source; extracting the data in a non-intrusive manner from the data source using a two phase process comprising a reconciliation phase and a collection phase; and transmitting one of an entire set and a subset of the extracted data based on the request. The remote data collection method can further include copying the data from the data source to a shadow database; and processing the data in the shadow database to provide the entire set and the subset of the extracted data, wherein the data source is read only during the remote data collection. The shadow database can be separate from the data source, and wherein the non-intrusive manner utilizes the shadow database for any insertions, updates, or deletions thereby preventing any interference, corruption, or modification of the data source by the processor during the remote data collection. The remote data collection method can further include marking data stored in the shadow database with metadata to distinguish between existing data, modified data, deleted data, or new data, in order to facilitate the remote data collection process. The remote data collection method can further include creating the shadow database based on database schema, tables, and columns defined by the current collection object for the data source; wherein the shadow database is adapted to a type associated with the data source thereby enabling the remote data collection to operate on a plurality of software, systems, and data files for obtaining extractable data therefrom. The data source can include one of a text file, a spreadsheet, a structured query language database, an Indexed Sequential Access Method file, and a flat file. The remote data collection method can further include performing peer-to-peer ad hoc dynamic data replication and synchronization with a remote data system; and utilizing a dynamic command language with the remote data system to determine what data sets to retrieve, how to extract the data sets, and compare extracted data to targeted or requested data. The remote data collection method can further include performing the reconciliation phase to determine what data to extract from the data source, to determine how to extract the data from the data source, and to define a current collection object for extracting the data from the data source; and performing the collection phase to synchronize data between the data source and the shadow database, to process the data in the shadow database, and to send the processed data.

In yet another exemplary embodiment, software stored in a non-transitory computer readable medium and including instructions executable by a system, and in response to such execution, causes the system to perform operations including receiving a request for remote data collection to extract data from a data source; interfacing to the data source in a read-only manner; performing a reconciliation phase to determine what data to extract from the data source, to determine how to extract the data from the data source, and to define a current collection object for extracting the data from the data source; performing a collection phase to synchronize data between the data source and a shadow database, to process the data in the shadow database, and to send the processed data; and transmitting one of an entire set and a subset of the extracted data based on the request.

In yet another exemplary embodiment, a remote data collection system includes one or more servers coupled to one or more data sources; a plurality of remote clients communicatively coupled to the one or more servers, each of the plurality of remote clients comprise a remote client agent communicatively coupled to one or more client data sources; and a metadata message transport mechanism configured to coordinate, control, and replicate data between the plurality of remote clients and the one or more data sources, and wherein the metadata message transport mechanism is further configured to provide communication and control between the one or more servers and the plurality of remote clients, the control includes the one or more servers being configured to remotely control the replication of data from one of the one or more client data sources through the one of the plurality of remote clients. The remote data collection system can further include a definition server communicatively coupled to each of the plurality of remote clients, wherein the definition server is configured to provide a plurality of definitions for each remote client agent, and wherein the plurality of definitions define collection rules for data in the client data source, the collection rules comprising dynamically generated extraction rules for data and subsets thereof with the extraction rules determining operation of the plurality of remote clients for the replication of data from one of the one or more client data sources. The remote data collection system can further include an update server communicatively coupled to each of the plurality of remote clients, wherein the update server is configured to provide updates to the plurality of remote client agents, wherein the updates are configured to modify the metadata message transport mechanism and associated control for the replication of data. The one or more client data sources can include data from one of a line of business application and point of sale application; and wherein the remote client agent can include an abstract implementation configured to operate on a plurality of database types with the one or more client data sources including at least two different database types of the plurality of database types.

The metadata message transport mechanism can include a plurality of message types exchanged between the plurality of remote clients and the one or more servers to remotely control the replication of data from one of the one or more client data sources; and wherein the metadata message transport mechanism contains formatted data that is abstracted by a remote data collection system using message handlers thereby enabling future upgrades to the message handlers to add new messages types or extend existing message types. The plurality of message types can include data messages, log messages, exception messages, update ready messages, update server online messages, update complete messages, update interrupted messages, update file messages, update configuration messages, definition request messages and definition messages. The remote data collection system can further include one or more shadow databases utilized in a data collection task, wherein, in response to the control from the metadata message transport mechanism, the data collection task copies data from one of the one or more client data sources to one of the one or more shadow databases and processes the copied data in accordance with a requested collection definition object for sending via the metadata message transport mechanism, the one or more shadow databases are used for operations in the data collection task to reconcile and collect the data. The data collection task can include a comparison function verifying copied data in the one or more shadow databases responsive to the requested collection definition object and a sending function to the one or more data sources from the one or more shadow databases.

In yet another exemplary embodiment, a computer includes a network interface; a connection to a data source; and a processor communicatively coupled to the network interface and the connection, wherein the processor is configured to execute a remote data collection agent; wherein the remote data collection agent is configured to coordinate, control, and replicate data between the data source and a server, and wherein the remote data collection agent utilizes a metadata message transport mechanism to communicate to the server through the network interface, the metadata message transport mechanism is further configured to provide communication and control between the server and the computer, wherein the control includes the server being configured to remotely control the replication of data from the data source through the remote data collection agent, and wherein the server is configured to automatically and remotely replicate and receive the data from the data source through the remote data collection agent. The remote data collection agent can be configured to receive a plurality of definitions defining collection rules for data in the data source from the server, the collection rules comprising dynamically generated extraction rules for data and subsets thereof in the data source, and wherein the remote data collection agent using the collection rules to automatically replicate and transmit the data from the data source to the server. The remote data collection agent can be configured to operate in a reconciliation phase and a collection phase, in the reconciliation phase, the remote data collection agent is configured to determine what data to extract and how to extract it from the data source using a shadow database, and in the collection phase, the remote data collection agent is configured to synchronize the data and to send the data using the shadow database. The data source can include data from one of a line of business application and point of sale application; and wherein the remote data collection agent comprises an abstract implementation configured to operate on a plurality of database types such that the remote data collection agent operates on the data source independent of a type of database of the data source. The metadata message transport mechanism can utilize Java Message Service for secure transmission over the Internet; wherein the metadata message transport mechanism can include a plurality of message types exchanged between the remote data collection agent and the server to remotely control the replication of data from the data source; and wherein the metadata message transport mechanism contains formatted data using message handlers thereby enabling future upgrades to the message handlers to add new messages types or extend existing message types.

The computer can further include a shadow database utilized in a data collection task, wherein the shadow database is communicatively coupled to the processor, wherein, in response to the control from the metadata message transport mechanism, the data collection task copies data from one of the data source to one of the shadow database and processes the copied data in accordance with a requested collection definition object from the metadata message transport mechanism, the shadow database is used to perform operations on the data as defined in the requested collection definition object. The data collection task can include a comparison function verifying copied data in the shadow database responsive to the requested collection definition object and a sending function to the database from the shadow database.

In yet another exemplary embodiment, a method of remote data collection includes receiving an agent installation package at a remote client; initiating the agent installation package; installing a service process that facilitates automatically starting a launcher process; loading the launcher process thereby installing a plurality of components of a remote client agent; communicating through a plurality of metadata messages with a server to provide defined data from a data source at the remote client to the server, wherein the plurality of metadata messages enable the server to automatically and remotely replicate the defined data using a data collection process with a reconciliation and a collection step each using a local shadow database to collect, operate on, and verify the defined data; and using the plurality of metadata messages to control operation at the remote client and to determine subsets of the defined data to control, extract, and transport to the server. The method can further include receiving collection definitions from the server; extracting data from the data source responsive to the collection definitions; writing the extracted data to the local shadow database; processing the extracted data in the local shadow database based on the collection definitions; comparing the extracted data to data in the local shadow database; and sending data messages comprising the extracted data to the server. The method can further include extracting a table and a column definition from the collection definitions; matching a requested table and column definition with a table and column of at least one of the data source, the local shadow database and a server data source. The method can further include sending an update number to the server; receiving an update package from the server; and installing the update package on the remote client to support new messages, different database types, or modify existing messages. The data source can include data from one of a line of business application and point of sale application.

In yet another exemplary embodiment, a remote data collection system includes one or more network communication endpoints dynamically created to connect a plurality of remote agents to one or more central servers including a network namespace of endpoints which are dynamically monitored, managed and which provide a real-time linkage between remote agent and central database; wherein the plurality of remote agents and the one or more central servers are connected in a bi-directional fashion whereby the real-time linkage is provide by a plurality of metadata messages and the real-time linkage includes communication and control; wherein the plurality of remote agents are communicatively coupled to a plurality of data sources; wherein the one or more central servers are configured to replicate and collect data from the plurality of data sources using the plurality of remote agents using the one or more network communication endpoints; and wherein the plurality of remote agents and the one or more central servers are configured to operate in a database independent manner relative to the plurality of data sources using abstraction layers to hide implementation details for various database types.

BRIEF DESCRIPTION OF THE DRAWINGS

The present invention is illustrated and described herein with reference to the various drawings, in which like reference numbers denote like method steps and/or system components, respectively, and in which:

FIG. 8 is a partial diagram of a collection schedule;

FIG. 12 is a table of various node message sender class types;

FIG. 15 is a table describing some of the definition rule attributes and metadata;

DETAILED DESCRIPTION OF THE INVENTION

Figure 1:
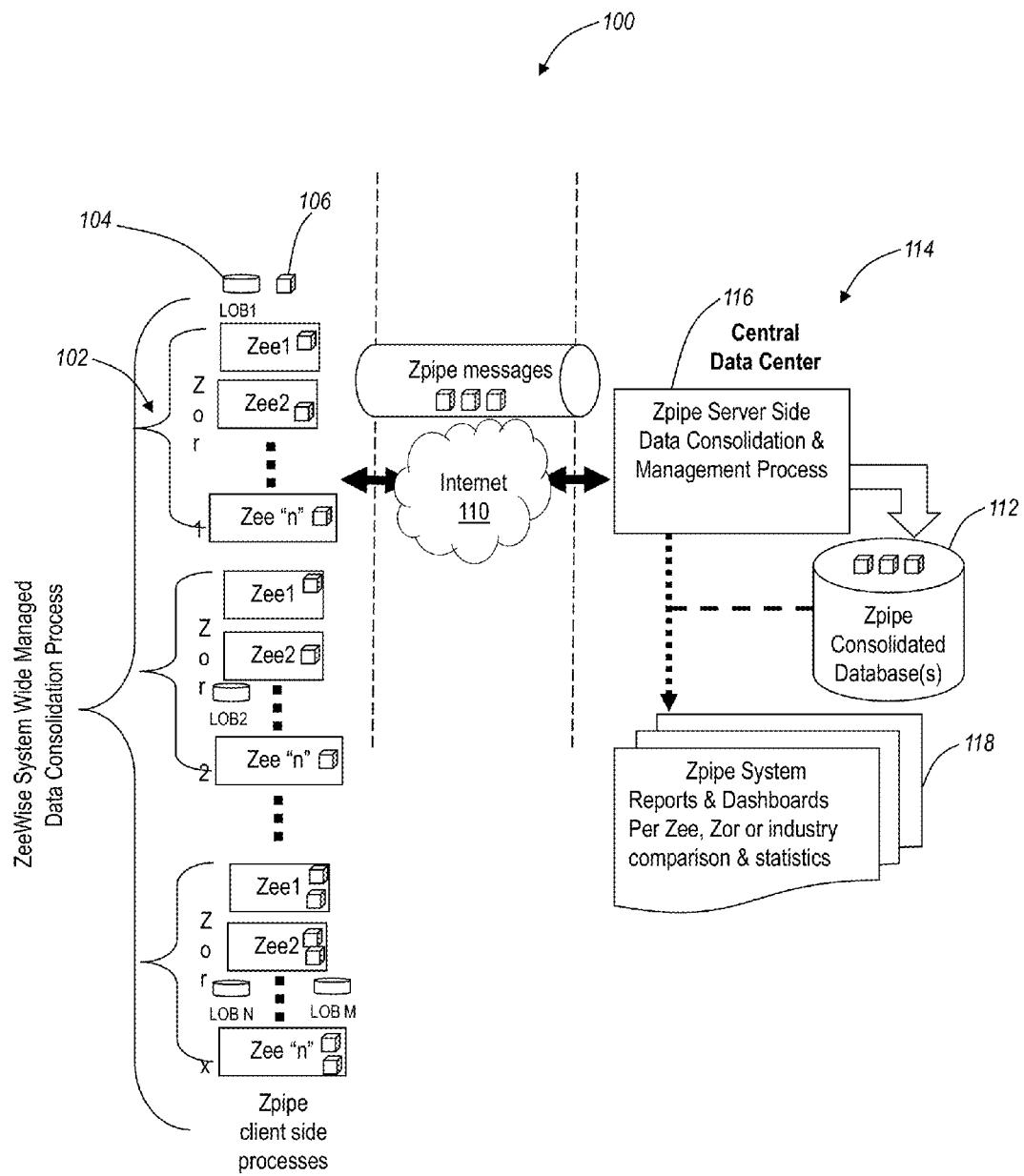
FIG. 1 is a diagram of a remote data collection system architecture.

The remote data consolidation process of the present invention is flexible, yet comprehensive and complete while allowing for variability, complexity and individual requirements of a variety of LOB applications running in a variety of situations at remote sites. The unique and novel design features and attributes provided by the definition abstraction model of the invention allow these capabilities to be adapted to the variety of LOB applications without executable program code being introduced into the LOB or database applications. Additional benefits of this design allow a central administrator to schedule data collection from a variety of remote LOB applications and database formats, across many sites without local IT help while yielding a central consolidated view of the entire business operation. Additional flexibility is shown through the use of optional LOB add-in components, local UI components to alert remote site personnel and allow them to be part of the automated process along with an optional deployment of the consolidation database server at a customer's site. As a result, the remote data collection system provides a database from which management reports, dashboards and monitoring can be performed to increase the efficiency, effectiveness and overall profitability of these remote sites while also allowing for increased visibility into the underperforming sites and enabling proactive support to be provided before it is too late. This is accomplished by the client agent and server design, the use of definitions and updates, along with a central management approach without the need for expensive and scarce remote IT people.

The flexibility of the present invention is derived from a foundation built on top of an abstract message passing architecture, plus the use "metadata" messages to control and configure the agent along with a layered code design which allows for the replacement of code layers without disruption or reinstallation of the entire system. The key to the lights-out remote control and operation of the system is due to the use of an automated installation package, plus a set of system metadata messages which define and control what to do at the remote agent once it is installed. This architecture allows the entire system to be centrally managed and monitored over the same message communication infrastructure which is used to collect remote data. The metadata messages are built from a configuration database which defines both the system "definition rules" and the client agent "update versions". The system also uses messages to provide for a centralized log of all remote agent state or status. Definitions are records which store the collection rules which tell the remote client agent what to do, how to do it and when to do it. Using the existing data replication message transport system, definitions and update files can be sent out to the remote sites to update the existing agent code and reconfigure the collection process. Thus, the overall system characteristics, including the flexibility, adaptability and performance with low IT overhead is due to many unique factors including but not limited to the combination of the system architecture, remote agent and server design, along with the metadata control and management system. This flexibility is required in order to easily adapt the system across the wide range of business conditions, various LOB applications and databases as part of an automated remote data collection system which does not require remote personnel support.

FIG. 1 is diagram of a remote data collection system 100 architecture according to an exemplary embodiment of the present invention. The system can work independently across all types of remote businesses locations 102, LOB applications 104, local or remotely hosted databases 106, and the like. As used herein, the term "Zee" means Franchisee, branch office, remote business site, and the like, and the term "Zor" means Franchisor, or the owner of a business concept who licensees the business model to independent Zees to operate, or any higher level business organization or entity or the like wishing to collect data from remote and/or independent sites. The term point of sale ("POS") device means an electronic cash register used to record customer purchases. The term Line of Business ("LOB") application means a process, whether running on a Personal Computer ("PC") or other embedded computing or processing device, which is used to run a business, stores data locally. Exemplary LOB applications include QuickBooks (from Intuit), Cyrius, or any other program configured to provide accounting, supply chain management, resource planning applications, and the like.

The various Zee remote locations ($Zee_1$, $Zee_2$, ..., $Zee_n$) are each associated with one another and constitute the notion of a Zor or franchise system ($Zor_1$, $Zor_2$, ..., $Zor_n$). Each of the remote businesses locations 102 includes network connectivity, such as through the Internet 110. Each Zee location can include one or more local database(s) 106 that includes data elements (either the entire set or a subset of the data) that the associated Zor would like to consolidate into a single database, i.e. a consolidated database 112. The consolidated database 112 can be located in a central data center 114 that is configured to operate a server side data consolidation and management process 116 to consolidate data from the various databases 106 at the various remote business locations 102. The consolidated database 112 additionally includes system reports and dashboards 118 configured to provide various user interface (UI) screens and graphs along with numerical charts and tables and KPI reports based on the consolidated data.

Figure 2:
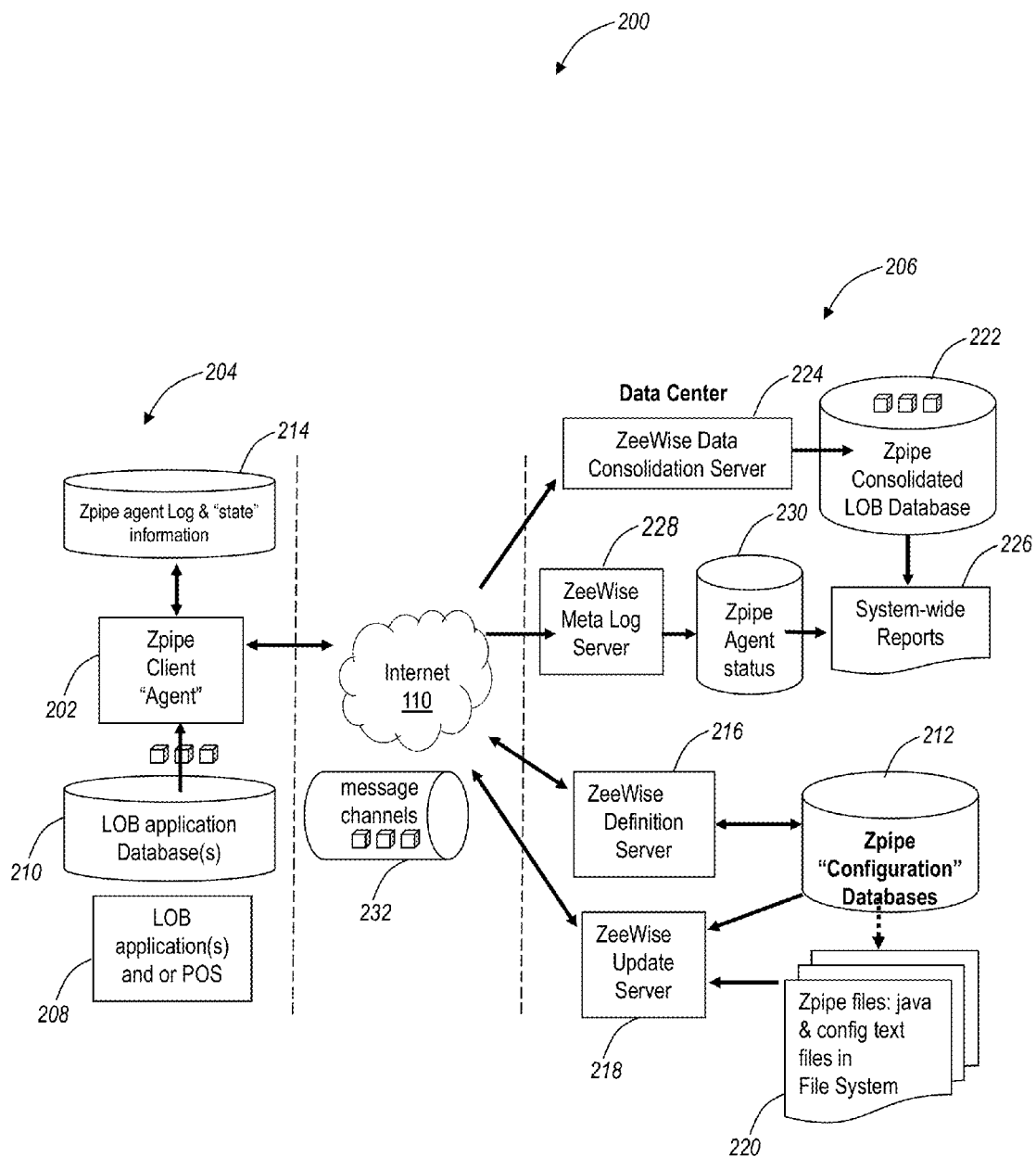
FIG. 2 is a diagram of a remote data collection system that includes a single remote client or agent.

FIG. 2 is a diagram of a remote data collection system 200 that includes a single remote client or agent 202 according to an exemplary embodiment of the present invention. The remote data collection system 200 includes two sites, a remote site 204 and a Data Center (DC) 206, interconnected over a network, such as the Internet 110. The agent 202 is configured to automatically collect remote data from a wide range of businesses, as well as multiple LOB applications 208 and databases 210 at a single remote site 204 as well as maintain local agent status and log the results of past and current actions 214. The control and operation of the remote agent 202 is due to its unique and centrally managed metadata command and control messages stored at the DC 206 in a set of "configuration" databases 212. The flexible system architecture allows this metadata to both define and control what to do at the remote agent 202 while allowing the entire system 200 to be centrally managed and monitored. The metadata configuration database 212 defines both the system "definition rules" and the client agent "update versions". Additionally the data center includes a database that contains a centralized log of all remote agent state or status 230.

The remote agent 202 metadata command and control definitions are defined as objects that store data collection rules which tell the remote client agent 202 what to do, how to do it, when to do it and which version or update of agent code components to use to perform the requested action for each LOB. These definition objects are serialized and stored as database records in the configuration database 212 and are retrieved by a definition server 216. The update configuration metadata commands are defined by records that contain "pointers" or references to code component files that are stored in directories on the server's file system which contain new client code "versions". The update metadata commands are stored in the configuration database 212 and retrieved by an update server 218. The definition and update objects can be sent automatically from the data center 206 to the remote site 204 to update the existing code and collection process rules at the remote client agent 202. The system 200 can also include updated code files 220 which in one embodiment are Java jar packages and configuration text files which encapsulate the updates available to the remote agent 202 as defined by the update metadata. The combination of the system architecture, remote agent 202 and server design, along with the metadata command and control along with the central management system allows the system 200 to have great remote flexibility. This flexibility is required in order to quickly and easily adapt the remote data collection system 200 across a wide range of business conditions, LOB applications and databases to automate remote data collection without remote IT personnel.

The architecture of the remote data collection system 200 allows the creation of a unique data consolidation process which can work across Zees, or remote business sites, as well as a diverse set of Zors, or any other type of business which desires to automatically collect data from a remote personal computer ("PC"), embedded computing device or POS device. At each remote site 204, a business can have different LOB or POS applications 208 running and these can each use different database engines 210. These businesses can also have a diverse set of installed PCs, software and data collection needs for different business processes. The remote data consolidation process of the present invention can be easily adapted from a central location to work across this variety of remote target sites and infrastructures via the metadata command and control definition objects 212. Further, this flexibility is automatically managed across both the Zee's within a Zor and across all Zors who subscribe to the remote data collection service. This design results in a centrally managed and consolidated set of LOB data, stored in a consolidated LOB database 222 and retrieved from the remote site 204 through a data consolidation server 224, that can be used by subscribers to improve their business performance (at the Zee or Zor level), by identifying key business trends and operational statistics as well as provide rolled up financial performance and other types of management reports 226 such as key performance indicator (KPI) reports. Note that while the terms Zor and Zee are used throughout this document, any set of remote businesses can be "collection clients" and the business method is not limited to Franchising or any specific industry or LOB application type.

The remote data collection system 200 facilitates providing a single system solution to a variety of problems which face many industries and companies where they do not own or control the remote sites or where there is no local IT staff to manage the process. When these businesses attempt to consolidate data from remote or independent business locations 204 in order to monitor business activity, they quickly discover the complexity of this process. Yet there are no existing shrink-wrapped tools or solutions for these types of scenarios which can be purchased and easily deployed. The system 200 can be quickly and easily adapted to a wide range of industries and business applications to provide a remote data consolidation system and may be designed with, but not limited to, the following attributes: (1) Database independence (the system 200 can work with SQL Server, Oracle, Sybase, Paradox, Access, proprietary formats, text files, XML files, etc.); (2) computer application independence (the system 200 may collect data from various types of LOB applications); (3) Site independence (the system 200 enables automated remote data collection without the need of onsite IT support); (4) Business model independence (works across range of industries, ex. Franchising, etc.); (5) Easy system agent 202 rollout via email notification, instant message service or webpages via embedded URI links and or a self-extracting setup program; (6) User interaction or diagnostics via optional LOB application add-ins and/or a system tray tool; (7) Ability to consolidate data at an alternative location while the management is still centralized; and (8) Ability to provide aggregated statistics, analysis and reporting on consolidated data, i.e. through system-wide reports 226 based on data in consolidated database 222, 230.

The system 200 can be quickly adapted to a variety of LOB application situations, while being successfully deployed to hundreds or thousands of remote sites which are operated in a remote, "lights out" automated manner providing consolidated LOB data. Moreover, the system 200 can use a flexible message passing, layered LOB data access architecture which allows it to be centrally controlled and operated while implementing a simple remote agent 202 that responds to these messages which are passed back and forth over a secure and reliable communication transport channel 232.

It is important to note that for many years database or other software tool vendors have provided many similar sounding features such as "publish and subscribe", but the implementation of these data replication products is limited to being incorporated into a single LOB system that is built with that vendor's database replication technique. The problem solved by the present invention is much broader than that faced by a single LOB application (e.g., a CRM system) because those are dedicated or single purpose data collection systems deployed on a single database vendors platform and only collect data from themselves. The system 200 includes a generic process which works across any type of LOB applications and across database vendors in an automated and lights out manner. Similarly, while traditional "middleware" message bus or message queue architectures have been used by enterprise businesses to link remote sites or to link two independent LOB systems together, these implementations required a consistent set of managed IT infrastructure (such as shared security models, private networks, and dedicated IT staff to develop custom software and manage these systems) in order to support a data collection system which could work across LOB applications or across database vendor platforms. Thus, the remote data collection system 200 is unique in its ability to work across all types of LOB applications, across database vendors and across business models or businesses, as well as across different types of business infrastructure (various computer and POS devices) and with no IT support processes while providing the ability to centralize and automate data collection from multiple remote business sites.

During the collection of remote data, the remote agent 202 is controlled and centrally managed using a combination of system "Definition and Update" messages as well as a plurality of status reports on the remote agent's activity, received from the remote agent 202 by a meta log server 228 and stored in an agent status database 230. A definition can be a set of business rules for one or more remote agents 202 that describe what to do, how to do it as well as other settings that are stored as a set of metadata records called a Data Collection Definition object. These definitions can be centrally managed in the configuration database 212 using a set of administration applications or web pages that allow a single admin to easily change the collection process for one, many or all remote agents 202 across one or more Zors. For each LOB that the system is adapted to support, the definitions can be serialized business objects stored as records that define the business operation rules such as which LOB data to collect at the remote site 204, which "method or way" or command statement or API to use to collect the data, where to find the data, as well as client side configuration info (what time to collect it, which client update version to use, where to send it, etc). The remote client agent 202 periodically checks for new definitions on a configurable, periodic basis which, when needed, are sent down to the client using the Definition server 216. Updates are tracked by an Update Number ("UN") that defines the specific version of code to use to perform a requested action by the remote agent 202. The updates are stored and organized in the Update database 218 using business specific metadata (examples include but are not limited to organizing updates by business or category type, by LOB application, company ID or "ZorID", a specific store location or client ID, geographic region or grouping code, etc.) that allows a single administrator to automatically target a set of remote agents 202 with a specific version of the agent code. The update metadata references the server's file system directories which organize and store both binary Java code files (e.g., JAR files) as well as text based configuration files (e.g. .conf) 220. The updates can be managed and configured system-wide (e.g. all Zors), per business concept (ZorID), per groups of remote clients, or per individual remote client via its specific ClientID. Note the targeting of versions can also support groups or subsets of Zees within or across Zors such as by a region or territory or by common LOB application. The update files 220 contain new remote agent code files that are pulled down by the remote agents 202 when they send update request messages to the Update server 218. These updated files 220 can add new system features or provide patches/bug fixes to the current remote client code via the automatic update process. Note that the entire flow of control and management information (definitions and updates) can be initiated from the client side 202. The client agents 202 can use a message passing model to initiate a conversation with the DC servers 206 that enables remote clients 202 to either "push" collection data up or "pull" definitions or updates down in a reliable and predictable manner. Additionally, the flow of messages and data can be sent in both directions for centralized data distribution.

The remotely collected information can be transported across the Internet 110 in a secure and reliable manner utilizing an extensible and flexible message passing architecture established over a communication transport channel 232. The actual transport of information between clients 204 and servers 206 has been abstracted so that the system 200 can use a combination of delivery methods or replace them as needed in the future. In an exemplary embodiment, the system 200 can use extensible messages, which are passed over the Internet 110 via managed communication transport channels 232. The managed channels can be established over a secure and reliable transport layer, such as but not limited to the Java Message Service ("JMS"), and are used to send and receive both data and system control messages in an asynchronous or synchronous manner. In an exemplary embodiment, the remote data collection system 200 includes, but is not limited to, eleven unique types of messages 232 that can flow in the channels created between the clients 204 and the data center 206, such as the message packets 232 over the Internet 110. These messages may include, but not limited to, data message, log messages, exception messages, update ready messages, update server online messages, update complete messages, update interrupted messages, update file messages, update configuration messages, definition request messages and definition messages.

Each message 232 can contain formatted data that is abstracted from the system 200 using message handlers in order to allow for future upgrades to handlers that can add new messages or extend existing message capabilities in the system 200. The remote agent 202 sends LOB collection data to the DC 206 using the messages 232 that are created by this message handler architecture. The remote agent 202 uses the definition rules to extract data and hand it off to message sending nodes that utilize the handlers to both create and send the messages. The messages 232 are handed over to the JMS layer for actual reliable transport and delivery to the DC 206. In addition to data, all other client state or status/log information are sent to the central DC 206 site using this same message passing architecture via additional unique message types.

The data messages 232 can be structured in multiple formats by a message handler which may produce multiple message formats including an XML based representation of client data from a particular LOB database table at the remote site. These messages 232 can contain one or more rows from the table. Total message size in bytes is a configurable setting and is used to tune transport level performance and reliability. In an exemplary embodiment, the data messages 232 can be sent from the client side 204 to the server side data consolidation servers 224 at the DC 206 servers. In another exemplary embodiment, the data messages 232 can flow in both directions.

Log messages can include remote agent log messages structured as a text string that originates from remote clients 202 that are then logged into the server side agent status database 230 by the Meta Log server 228. Log messages can include the progress or state of client applications, such as a timestamp of when a collection run was started, when data elements of a particular table have been changed or updated, the number of rows that a table has and if there were any problems with or changes to the LOB database, etc. Exception messages can wrap any Java Virtual Machine (JVM) or java code exceptions that occur. The exception messages facilitate delivering exception data from remote agents 202 to the central server logs.

The update ready messages can be used by the clients 202 to tell the DC update server 218 that the client is ready to receive updates and provide the server with the client's current update number version. This message initiates the update conversation between server and client. They are also used by the server to search the configuration database to determine what update number is available (in the event the update number is the same as the client's current update number, there is no update available and the client will continue to use its current version). Update server online messages can be used by the update server 218 when it comes online. The update server 218 can broadcast this message to any clients that are connected at that moment to let them know that the update server has completed a restart. This broadcasted message invalidates any current update conversations since the client is essentially notified that any previous messages were "forgotten" since the server 218 was recently restarted. This process facilitates preventing stalled remote clients from waiting indefinitely (i.e. when remote clients are waiting for Update Complete Messages which won't be sent due to the server side interruption and restart.). The clients can restart the update process and check for updates again to initiate a new conversation. Update complete messages can be used by the update server 218 to tell the remote client 202 that it has completed sending all update messages. This message ends the update conversation (from the server end point of view) and the client may close the message communication channel and load the new client code before a new collection run is started.

Update interrupted messages can be used by clients to tell the update server 218 that an interruption occurred on the client side. In the event servers are interrupted, the servers can send an update server online messages telling the clients that the servers have been interrupted and to ask for an update again. For example, interruptions can occur because, but not limited to, a java thread "threw" a java exception due to an unhandled exception, such as a write attempt to a local client storage medium which was full. Update file messages can be binary messages that include a JAR file that can be written to the client side storage medium. For example, there can be, but not limited to, one message per file and one file per message. Update configuration messages can be messages that contain the current settings and values that are used to update the client configuration files. For example, there can be, but not limited to, one message per client configuration file. Alternatively, the messages can include at least one setting in the configuration file. Definition request messages can be used by clients to request that the definition server 216 send the current definition version they should use. For example, the clients can wait to receive a definition message response from the server 216 before proceeding to obtain their current rules. Definition messages can wrap or encapsulate the collection definition business rule object that can be sent from the definition server 216 to the client to control its operation.

Figure 3A:
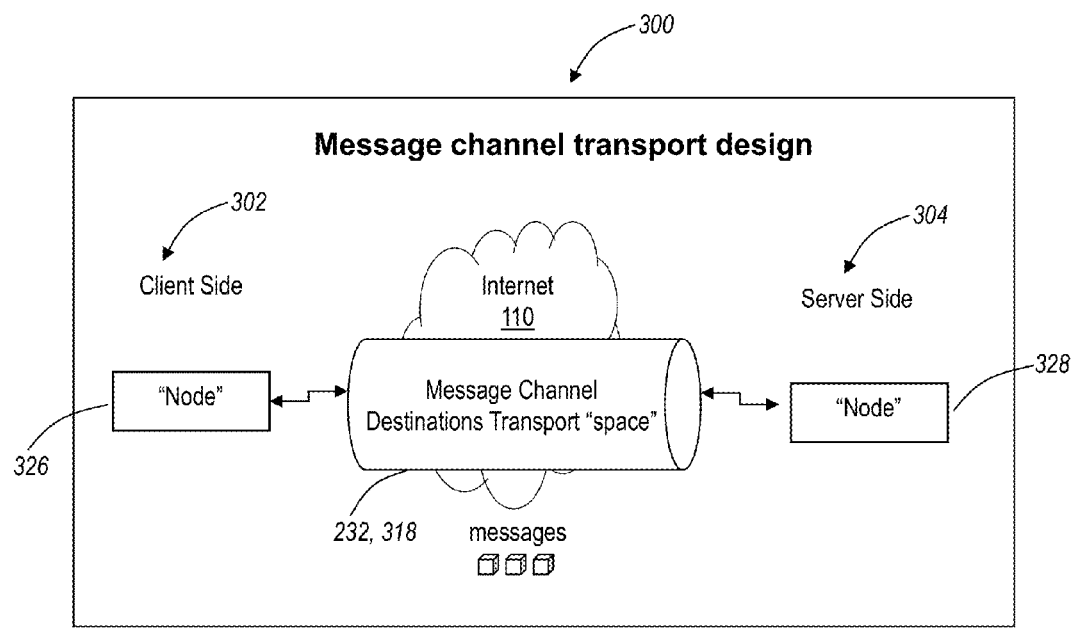
FIGS. 3A and 3B are diagrams of a communication channel between a client side and a server side for remote data collection.
Figure 3B:
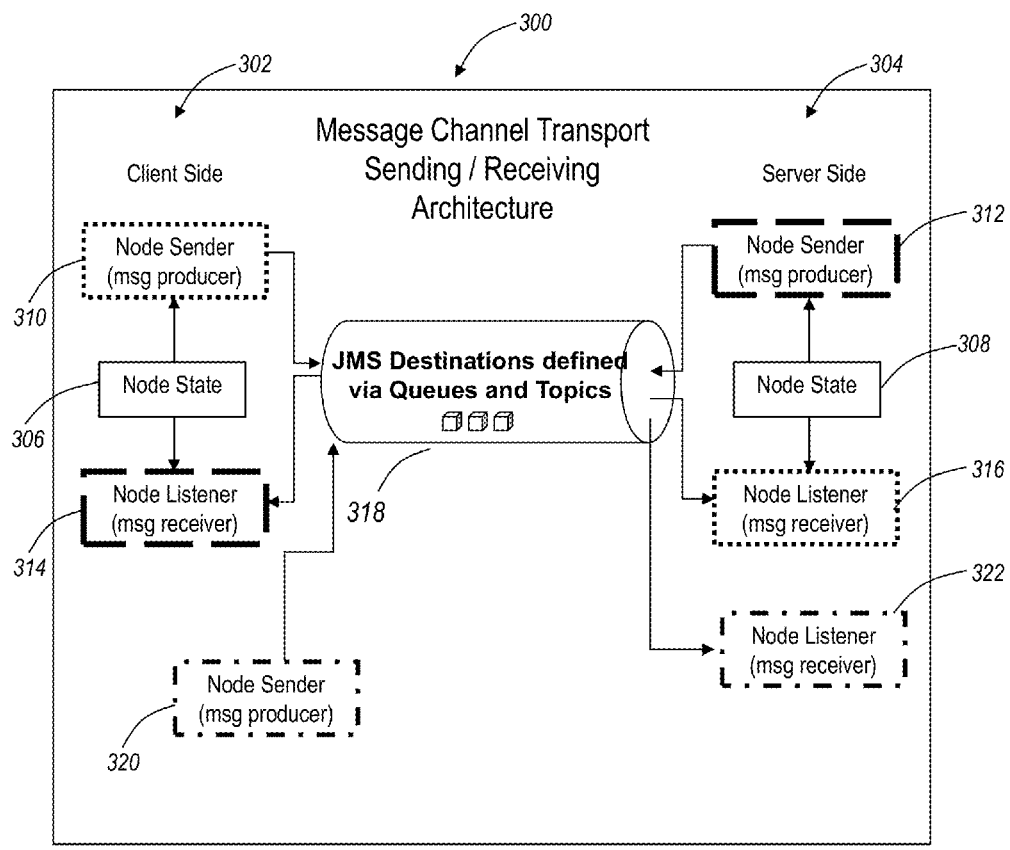
Figure 9:
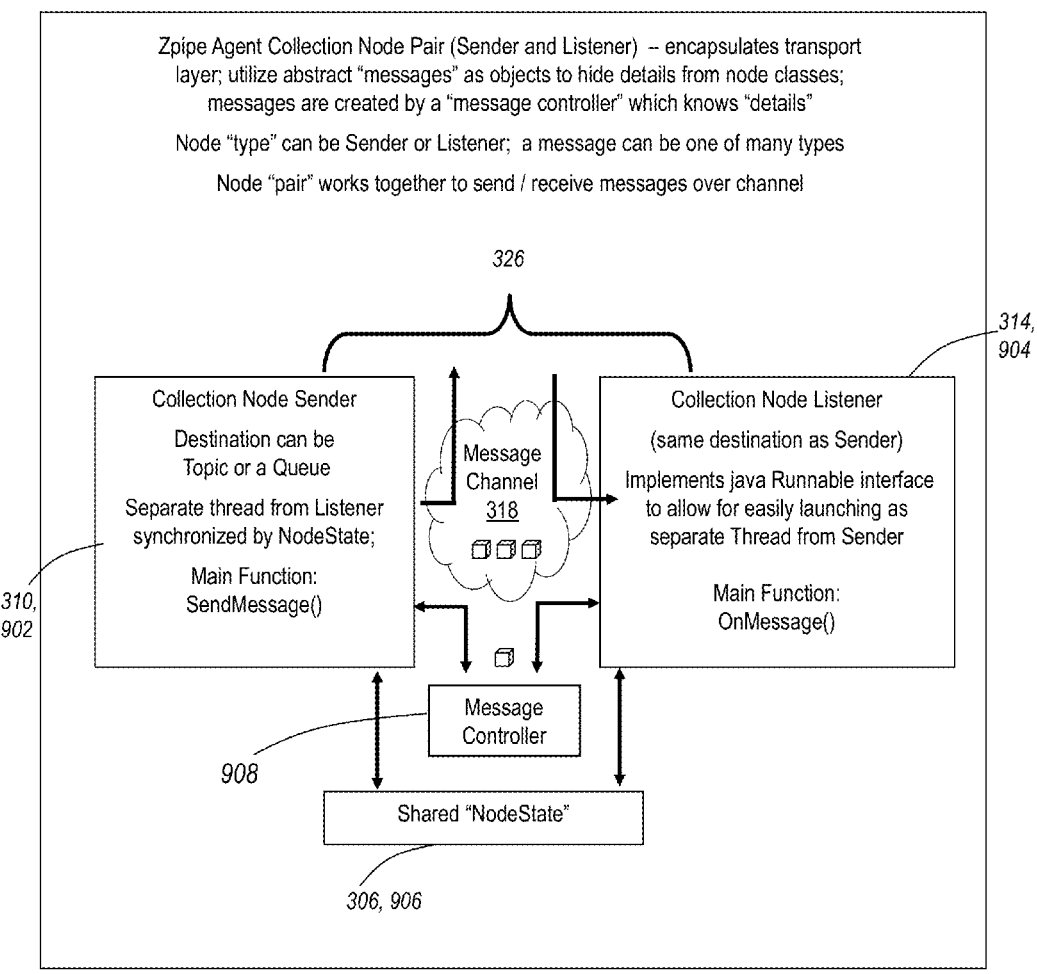
FIG. 9 is a diagram of an agent node sender/listener pair.

FIG. 3A and FIG. 3B are diagrams of a communication channel 300 between a client side 302 and a server side 304 for remote data collection according to an exemplary embodiment of the present invention. In an exemplary embodiment of the invention, the communication channel 300 can include a JMS transport layer 318 to facilitate the communication of messages across the Internet 110. Collectively, the client side 302 and the server side 304 are part of the remote data collection system 200 of FIG. 2 which use 'nodes' 326, 328 to send and receive messages over the transport layer 318. More specifically, the system 200 can use specific types of 'nodes' 310, 312, 320 as "data senders" and 'nodes' 314, 316, 322 as "data receivers or listeners" for message transport between client side 302 and server side 304. A node abstracts the concept of a network layer transport 'endpoint', a place where network communication originates or terminates. A node 'pair' is the combination of one node sender 310 and one node listener 314 and furthermore their shared node state 306 at a specific machine (FIG. 9). A node pair encapsulates all of the logic for two-way communication (send and receive) over the network transport layer. For example, a JMS transport layer can use uni-directional synchronous communication per thread—either send or receive. A node-pair can be used to abstract the single-threaded JMS uni-directional communication model, and instead encapsulate the entire two-way (send and receive) communication. Two nodes, one node sender 310, 312, 320 and one node listener 314, 316, 322 at one client side 302 and one server side 304, communicate over a network transport layer such as JMS which utilizes a still lower level network layer such as the Internet 110 to create a communication channel 318 that is used to transmit messages from client side to server side or vice versa. A communication channel 318 can be two total nodes, one node client side 302 and one node server side 304 (e.g. 320, 322)—for unidirectional communication. Alternatively, a communication channel can be four total nodes, one node pair client side 302 and one node pair server side 304—for bi-directional communication. Thus the system 200 uses sets of node-pairs which match the respective processes on the client 302 to the server 304 and vice-versa. The system 200 can use a JMS transport space 318 as a management model or abstraction level to provide a means of delivering a reliable and scalable network communication infrastructure.

In an exemplary embodiment, the node senders 310, 312, 320 and node listeners 314, 316, 322 on any specific machine (client 302 or server 304) can work together and can share a common set of state information, or NodeState 306, 308, that allows them to synchronize the threads that perform the node abstraction level message transmitting work. The system 200 'destinations' are managed objects which contain messages to deliver information to a specific location (agent, server or service). The system 200 uses JMS destinations as concrete implementations of communication channel 318 destinations and the set of all destinations forms the "transport space". That is, nodes connect to a specific JMS destination and message traffic is contained within that destination. JMS destinations are defined by server hostname, port number and destination name and type. These attributes are stored within a configuration file sent down to the remote agent as part of the definition configuration information which defines where the nodes used by the remote agent should send their messages and this remote site node configuration can be updated by update messages. The JMS destinations are managed using JMS tools that allow an administrator of the system 200 to create or destroy the destination objects manually. Note that the JMS objects can instead be managed automatically by using the JMS feature of client initiated destinations. That is, no user management of the server side JMS services is needed to manage new destinations because they are automatically created using the JMS client initiated auto-creation method. Once a destination is created, the node processes are immediately able to utilize them by name to identify where to "send" their messages.

The JMS implementation, which can be running on a DC server, enables the system 200 to create a high-level destination or communication channel management model that can be used to easily visualize and manage the communication transport channels. This management model view of destinations is referred herein as a transport layer space 318 which is an additional system abstraction layer. It is the overall transport layer space, utilized by the remote data collection process, which provides for the reliable transmission of message packets in an abstract manner which allows the system to be adapted to other data transport systems. This same communication channel infrastructure is also used to provide updated code as well as definitions to the remote agents 202.

The JMS destination names can be organized by business concept (e.g., ZorID) to provide a coherent and convenient management organization model. Alternatively, the destinations can be named and utilized in a shared manner to instead maximize efficiency instead of administrative name clarity. In the JMS architecture, transport destinations are defined to be either topics or queues, depending on the type of communication channel needed. In the exemplary embodiment, topics can provide a many-to-many communication channel between one or more node senders 310, 312, 320 and one or more node listeners 314, 316, 322. Moreover, alternative implementations may use queues to provide a many-to-one communication channel between one or more node senders 310, 312, 320 and a single node listener 314, 316, 322 which empties the queue. In the exemplary embodiment, a data consolidation 224 server retrieves data from a JMS queue populated by a single remote agent 204 while the definition and update servers 216, 218 instead utilize JMS topics for bi-directional communication to and from many remote agents 204. Moreover, in the exemplary embodiment, data can be sent from remote sites to the data consolidation server 224. Specifically, the data consolidation server 224 at the DC includes a node-listener object 314, 316, 322. Alternatively, the data consolidation server 224 at the DC can include a node-listener object 314, 316, 322 and/or a node-sender object 310, 312, 320. In another exemplary embodiment, the system 200 can distribute and send LOB data including but not limited to new business rules for the LOB database back down to remote sites 204 as well as collect it up to the DC 206.

Figure 4:
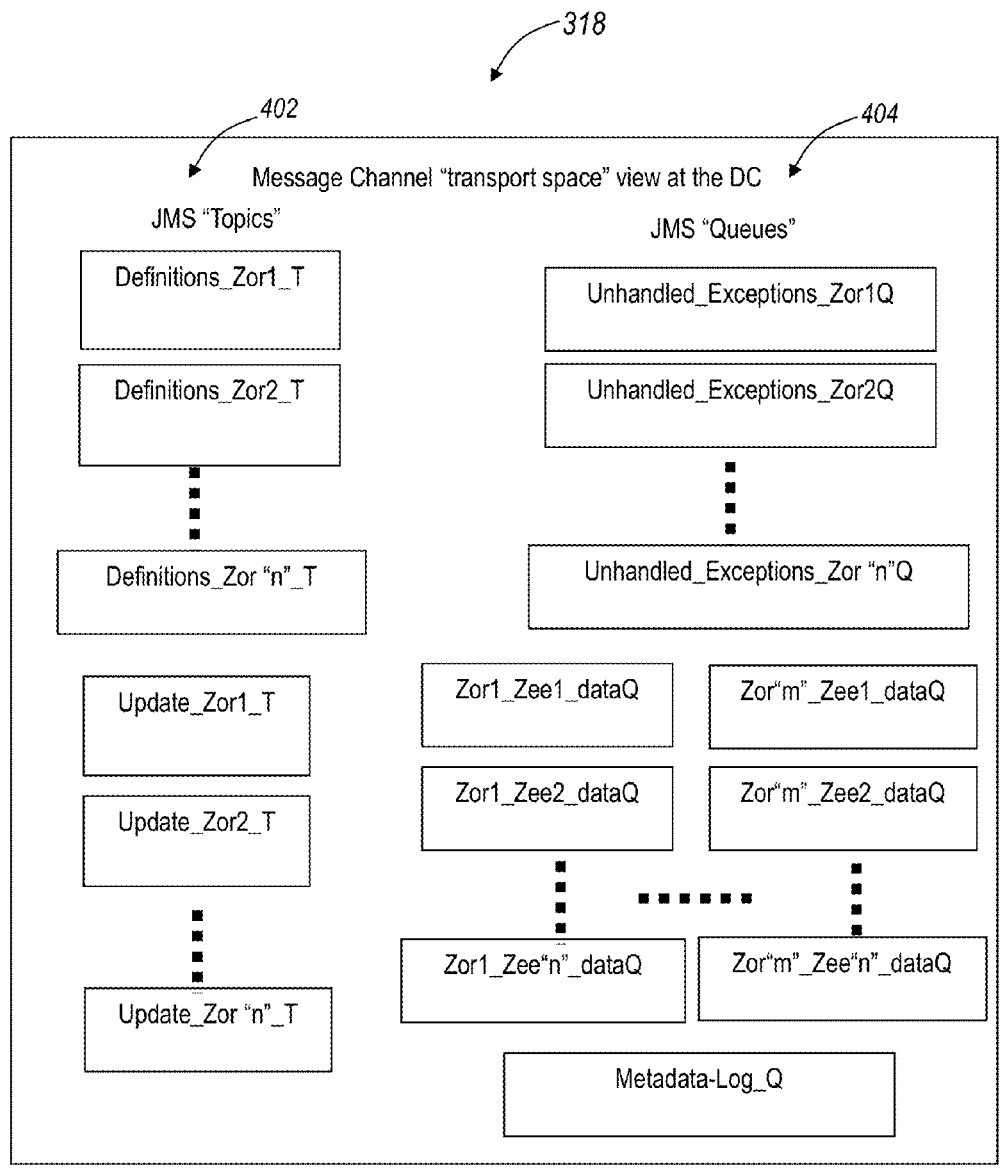
FIG. 4 is a diagram of a transport space view at the data center.

FIG. 4 is a diagram of a transport space 318 view at the data center according to an exemplary embodiment of the present invention. The transport space 318 facilitates managing the channels that are used to flow messages across the remote data collection system of FIG. 2. A message queue is serviced by a node listener 314, 316, 322 process that pulls messages from the queue for processing and centralized storage. Moreover, the data consolidation server can utilize queues 404 to allow many clients to send data to a server process, such as a multi-threaded, a multi-hosted and/or a parallelized set of services. The server process can then de-serialize the data messages to create unique data records that are then inserted, updated and/or deleted within the central database 224. When the remote LOB data has been consolidated and centralized, the system 200 can provide further data processing features including, but not limited to, data mining, statistical analysis or trend analysis, KPI's and integration with other business systems along with extensive reporting. This aggregated remote data provides a business customer with a unique opportunity to gain insight or business intelligence into the operational characteristics, performance and overall health of their remote business.

Note that using the auto client create method, the administrator does not need to perform any proactive administration to create the JMS transport space 318. Instead, the remote clients send messages to a JMS destination by name, this destination can be automatically created as a server side JMS object (topic 402 or queue 404) if it does not already exist. Additionally, management tools can monitor the transport space 318 to identify new endpoints that do not have corresponding listener node threads. That is, while JMS handles the automatic creation of the endpoints on the server side and stores messages bound for it in a persistent and durable manner, these new endpoints may not be serviced if this is the first time the remote client has run the collection process. Thus, a server side self-monitoring process is used to watch for auto-created endpoints that need to have a new server side thread process created in order to service the new collection endpoint. Optionally, an exception report 226 can be generated to notify the administrator that a new collection client has been detected.

The node topic 402 or queue 404 objects can run in the JMS service. Moreover, the system 200 utilizes these JMS objects and services in this transport space 318 to abstract reliable sending and receiving of data packets over the network between the clients and the data center. Alternatively, the system 200 can utilize and/or substitute additional transport layer technologies in place of the JMS layer by implementing this same transport space in the new transport layer. Also, the system 200 can be used with any type of transport or message layer that enables the system 200 to function as described herein. The remote data collection process which moves data from many remote sites into a central datacenter can be reversed, such that data is sent back to the remote clients when and if it is necessary.

The specific client agent and server design is described below. Note that the client and servers are represented or modeled in independent diagrams because they are loosely coupled via the message passing architecture 300. However, the client and server processes can be viewed to be part of a single system design that accommodates the flexibility and adaptability needed to work autonomously across a variety of systems. For example, a specific client is not aware of the remote server or message transportation specifics and vice versa; however, the central DC 206 does track the remote client status and configurations. The message passing nodes 326, 328 connect each side with their corresponding counterpart and allow for the passing of both control and configuration messages as well as LOB data to occur reliably and automatically.

Figure 5:
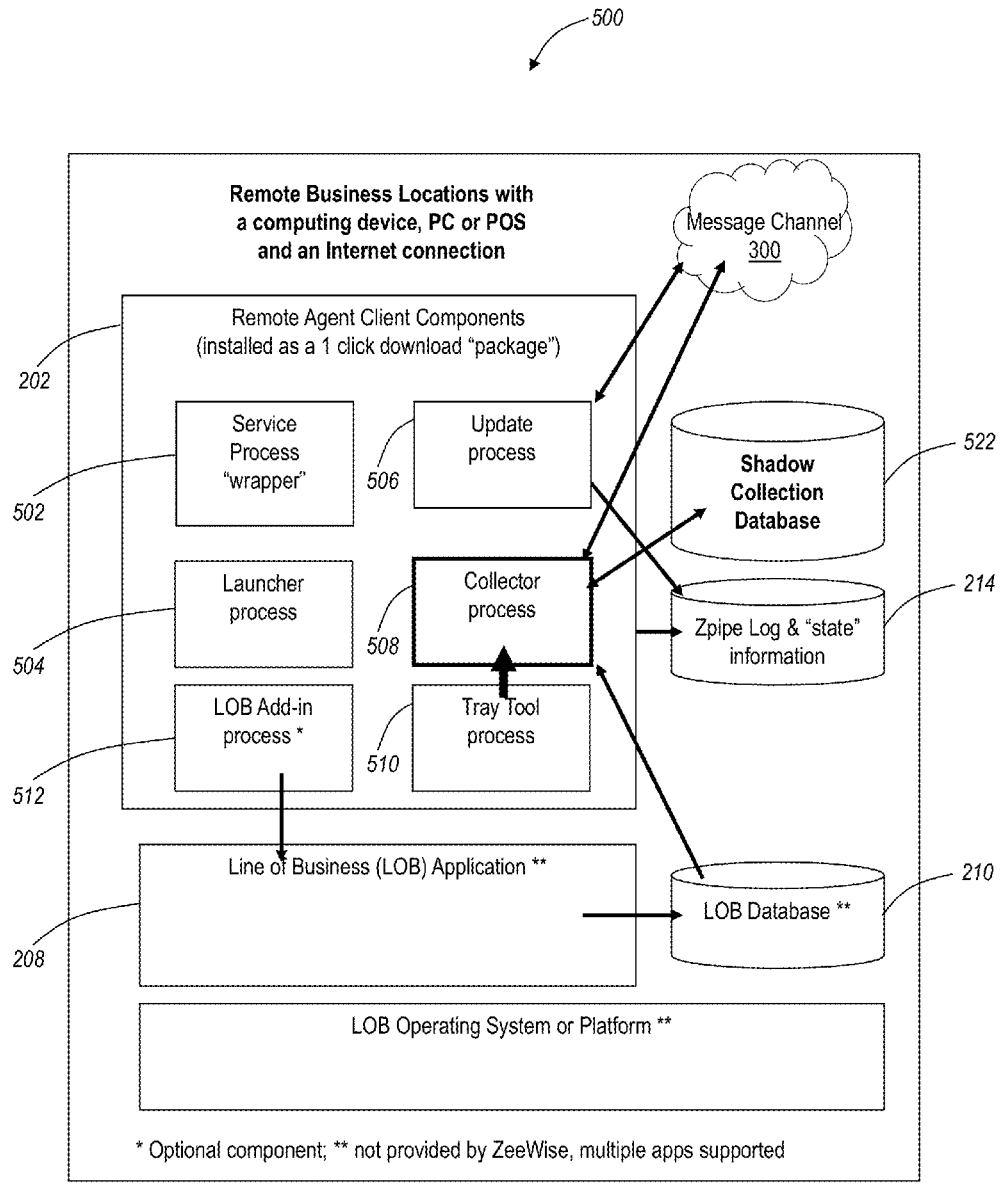
FIG. 5 is a diagram of a client side of the remote data collection system.

FIG. 5 is a diagram of a client side 500 of the remote data collection system according to an exemplary embodiment of the present invention. Both the client side 500 and the central server side rely on the abstraction of message sending to coordinate and control their work. In an exemplary embodiment of the present invention, the system 200 utilizes Java code to be platform independent and to allow it to attach to a variety of LOB applications, databases and operating systems, computing devices or POS platforms. This portability allows for the use of wrapper layers that create abstraction layers hiding implementation details for the various database, transport or operating system components and other software layers. The layered architecture provides the system 200 with the independence and portability features required to solve remote data collection problems from a variety of independent business systems. That is, in order to have a minimal impact on a remote, non-IT managed computer system, the system 200 can use replaceable layers or components that are easily adapted, defined, updated and version controlled by a centralized configuration. The remote client agent 202 can be downloaded to the client side 500 and installed via a 1-click setup package that can optionally automatically verify a variety of data values or configuration requirements including the remote site identifier (e.g. ClientID) and then automatically update itself on a periodic basis. The component layers can be changed or updated independently as required or requested without changing the entire system or requiring a complete re-install. In addition, this self-updating feature eliminates the need for local human intervention to complete the changes or updates to the remote agent 202. A Java Virtual Machine ("JVM") (not shown) can run the remote client agent 202 software code. Additionally, the JVM can host and run the standard JMS classes that provide for the message transport space 318 interfaces which control the sending of the actual messages across the Internet 110.

At the remote client site 500, a service wrapper process 502 component can be used to auto-start the remote data collection process as a service on a local business device (PC or POS) as well as configure the JVM to load and run the other remote data collection components. The service wrapper process 502 monitors the JVM for restart messages and if detected automatically re-loads a launcher process 504. The service wrapper process 502 ensures that the launcher process 504 is started and running at both power-up boot time and throughout the operation of the local business device (PC or POS). Finally, the service wrapper process 502 can configure the JVM to initially load current remote data collection JAR files via file path settings, memory requirements, etc.

The launcher process 504 is a singleton Java process that can load and launch other remote data collection processes. The remote data collection system 200 is a layered service where each layer is responsible for a small, isolated feature set that allows the system 200 to interact with the other layers using Java calls, messages, .conf settings and the JMS. The launcher process 504 can be viewed abstractly as a supervisor process that ensures that other remote data collection processes are running properly. Specifically, the launcher is utilized as a synchronization root to allow loosely coupled sub features or processes on separate threads to abstractly interact with one another. Additionally it provides access to global configuration information. Alternatively, the launcher process 504 can set an exit condition and shutdown the JVM. The exit condition set by the launcher process 504 can be monitored, or read, by the service wrapper process 502 layer upon exiting the JVM and can be used to signal to the service wrapper process 502 that the JVM and its processes should be restarted. This monitored watchdog process provides for simplified and predictable reliability at remote sites.

When the JVM is started, the launcher process 504 is auto-started and it reads the local configuration files to determine what other processes should be stored in memory. Then the launcher process 504 loads those other Java classes inside the JVM. Also, the launcher process 504 serves as an interface for all Input/Output (I/O) to the local text configuration files (e.g. .conf). The launcher process 504 redirects the JVM Standard Error output port to use a log process to ensure all Java errors are written into the client-side central log 214. In one exemplary embodiment, the launcher process 504 is configurable via the metadata messages. The launcher process 504 also holds the agent state information such as data values for "is Collecting", "is Updating", "UpdaterStarted" that enables the various remote agent 202 sub processes to have abstract access to global agent state information. Both updater and collector processes 506, 508 can query the launcher process 504 for the current system state to determine what actions they should or should not take. Additionally, the launcher process 504 constructs and launches the updater and collector Java classes via a custom Versioned File System Class Loader ("VFSCL") that allows more control of the Java file loading process than the standard built-in JVM class loading mechanism. Class loading is managed by the VFSCL without using file locks which provides for another unique feature of the present invention as it ensures that code update changes do not conflict with each other, are not blocked by current remote agent operation, and are able to be rolled back. Finally, the launcher process 504 is also responsible for killing the update and the collector processes 506, 508 whenever needed and if needed the entire JVM. In such an event, the launcher signal is noticed by the Service wrapper 502 which kills and restarts the JVM, if needed.

The update process 506 is responsible for keeping the local installation up to date with the current version of the remote data collection code as defined in the master update database table stored at the data center 212. During operation, the update process 506 posts an update request message into the destination transport space 318 which is received by the Update Server 218. The purpose of the update request message is to check for any updated code or configuration files based on the client's currently running version which is defined by its update number. Generally, the update process 506 is asking the DC if it has a newer version of the remote data collection system available at the DC. This abstraction allows the update process 506 to maintain the correct, current code version and configuration settings at the local site as defined by the remote data collection system administrator. Furthermore the client only needs to know its current version while all update availability, decision making and delivery are handled by the Update Server 218 at the DC. When the client update process 506 receives a response, it either begins receiving file update messages or an update complete message if it is already up to date. The update process 506 then determines if it is necessary to restart the service wrapper process 502 and JVM to repeat the process if needed. The updates are packaged and sent as messages by the Update Server 218 and processed by the client to create new remote data collection code or configuration files stored in the local storage medium 214.

The collector process 508 connects to one or more of the configuration defined local LOB database(s) 210, extracts the required information, and may send the data to a destination or write the information to a local shadow database 522 and then prepares data messages to send to the DC via the message channel transport space 300. The collector process 508 includes many sub-processes and threads that are synchronized across its operation. The collector process 508 can also create log entries stored in a local state database 214 in order to identify which stage or process it is (or was last) running and what values or actions it has taken. Additionally, collector state can be packaged as messages and sent via the channel transport space to the MetaLog Server 228 which allows the central administer to produce reports 226 which show the state and status of this complex process across multiple sites with minimal effort.

A tray tool process 510 can be a local system agent process that interacts with the local user of the PC or POS device and notifies the user of important status or diagnostic messages and allows the user to take actions to change or correct the status of the remote agent 202. The purpose of the tray tool process 510 is to provide an optional user interface (UI) to the normally automated and hands-off operations of the remote agent 202. For example, whenever the system 200 identifies a problem the tray tool process 510 can notify the user. Moreover, the user can request the current status of their remote agent 202 of the system 200 using the tray tool UI. The tray tool process 510 runs as a system object in a manner consistent with other operating system utilities and tools. In an exemplary embodiment, the tray tool process 510 can include an icon that changes state (red/green) or creates a pop-up message to warn the user that the system 200 needs their attention. Examples can include when the collection process did not run during the scheduled time due to a power failure or if the Internet connection went down. The tray tool icon allows the user to click on it to display a menu which contains additional state information (e.g. last collected time, version number, etc.) as well as run additional diagnostic tests (e.g. connectivity tests via pinging the DC) or to attempt to start the collection process immediately using the manual "Run Now" command. Thus, the system 200 can run in a lights-out automated process or the tray tool 510 can provide the local user with the ability to interact with the automated remote data collection process and diagnose local problems such as local LOB connectivity problems.

A per LOB add-in process 512 is an optional component of the system 200 that extends the tray tool process 510 features directly into each of the local LOB application(s) 208 from which the agent 202 is performing data collection. This feature allows the local user to perform the "Run Now" command and other remote data collection management features from within the LOB application menu system. During operation, a local user can be working within the LOB application 208 and decide to send the current data to the DC, using the LOB add-in process 512. For example, in one exemplary embodiment of the invention the local user can select the File menu in the LOB application 208, then selecting the add-in menu called "Run Collection Now" they can manually trigger the data collection process to run immediately. Alternatively, the command location, text and function can be a configurable component defined by the definition files and is compatible with the LOB add-in extension method for that particular LOB product. This add-in model allows the user to control when data is collected by directing the system 200 much the same as the tray tool 510 is used.

Finally, the entire remote agent 202 can be packaged in a platform specific manner for installation and loading onto the remote client PC, POS or embedded device using an appropriate setup process that can be activated by a mouse click or other types of actions automated by software deployment tools. This setup process can be started via a variety of mechanisms including, but not limited to, an email message sent to the users at each location targeted by the administrator for remote automated collection. In such an embodiment, the email may contain text explaining the purpose of the remote data collection rollout program as well as a URL pointing to the HTTP or FTP location of the specific download installation package. The remote agent 202 installation package can be customized to the specific collection needs and remote data collection code for the local device. A business user at the remote site can be directed by the email to click on the link to facilitate copying the installation package to the local device from over the Internet 110 via HTTP or FTP download. Once the installation package is copied locally, the installation package code can be run automatically to extract the remote data collection files, copy them to the predefined location and configure them to operate according to the configuration files embedded into the installation package. The setup process can also copy the JVM code if needed to the remote PC and configure it for operation. Additionally the setup process can install the local service wrapper process which then both loads the JVM and automatically launches the collection process components whenever the remote device is started. As described earlier, when the remote data collection process first loads, the service process 502 causes the launcher process 504 to be loaded. It is the function of the launcher process 504 to launch the update process 506 the first time it is loaded. The first time the update process 506 is run, the update service sends an update request message to check for newer versions of code files. This auto-checking ensures that the local client 202 is running the correct version of the code and definition files even when the installation package has older or stale code versions. The system 200 can instruct the local client 202 to ask for the current system definition each time it is run. This auto-bootstrapping facilitates auto-installation of current versions of the code and definitions onto remote PC or POS devices without the need for extensive local human intervention or actions. After the installation and the first update process 506 has run, normal remote data collection operation procedures take over allowing the collector process to run as scheduled. Once the current and correct set of files is installed, the collector process 508 occurs on regularly scheduled intervals that can be defined by the definition object. Note that while the collector process 508 typically occurs on regular scheduled intervals defined by the definition, it can also be launched for immediate operation using the "Run Now" command via the optional tray tool 510 or the LOB add-in tool 512 or other methods.

Figure 6:
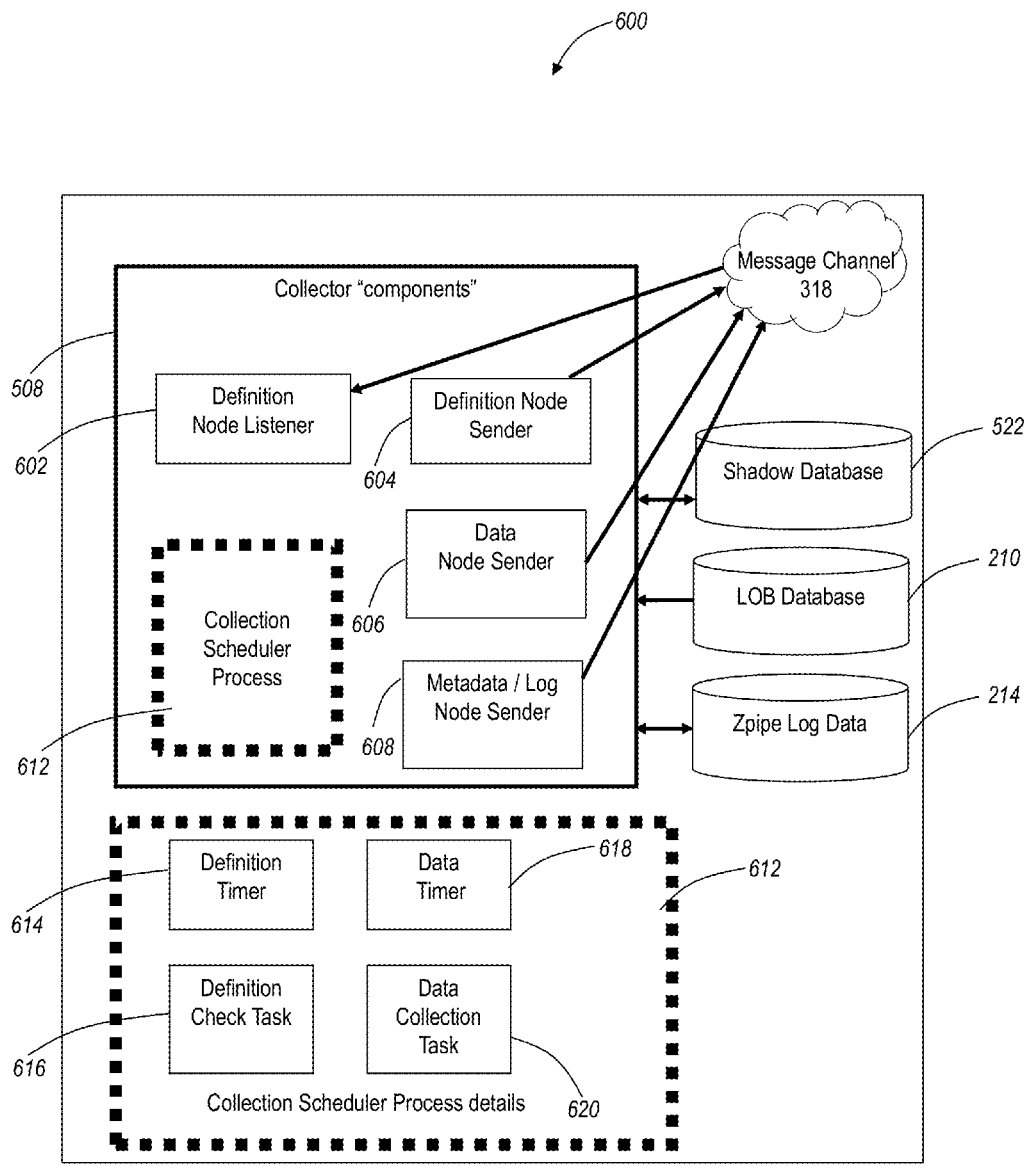
FIG. 6 is a diagram of a collector process.

FIG. 6 is a detailed diagram 600 of a collector process 508 according to an exemplary embodiment of the present invention. The collector process 508 running on the remote client 202 includes a definition node listener 602, a definition node sender 604, a data node sender 606 (an optional data node listener is not shown), a metadata/log node sender 608, and a collection scheduler process 612. The local node-sender 604, 606, 608 or node-listener objects 602 implemented by the remote local client 202 send or receive messages to mirrored implementations at the DC 206. The collector process node objects facilitate processing the messages that are sent back and forth via the message channel transport layer 300. It is this general purpose message passing framework that enables the remote data collection system to operate. The collection scheduler process 612 includes a definition timer 614, a definition check task 616, a data timer 618, and a data collection task 620.

Figure 7:
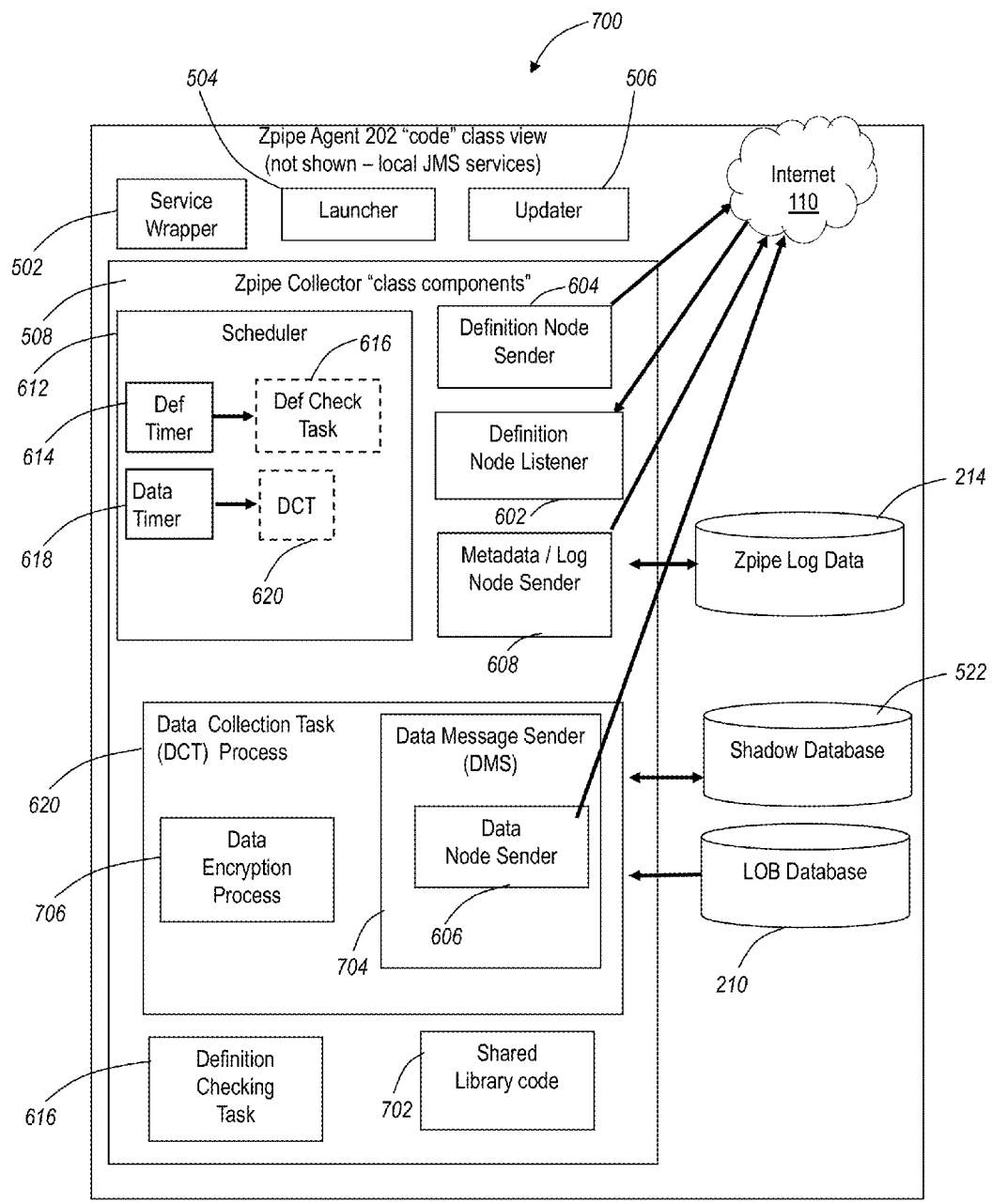
FIG. 7 is a diagram of key agent code classes.

FIG. 7 is an alternative view to FIG. 6 which is based on a code or object level diagram view of the key classes 700 that are included in the remote agent 202. The agent 202 uses the collector process 508 to collect data from remote databases according to an exemplary embodiment of the present invention. The collector process can contain additional shared library code 702 and a plurality of other standard java classes to facilitate creating the client side collection process needed to send messages via message channel 318 which is implemented via classes contained in the JMS (not shown) to send data over the Internet 110. Additionally, to further abstract the data collection process from the message implementation process, the DCT 620 uses a Data Message Sender 704 class to process the creation of data messages from various and multiple LOB databases 210. Optionally, the DMS process may utilize a data encryption process 706 to secure the content of messages. Finally, the Data Collection Scheduler 612 creates timers 614, 618 for the collection process as in memory objects which monitor the local device time in order to launch the definition checking and collection tasks at the appropriate time.

FIG. 8 is a partial diagram of a collection schedule 800. The collection schedule 800 defines only a subset of key, scheduling-related properties from the full collection definition object defined in the definition and configuration database 212. It may include the day and time of the first scheduled DCT 620 launch, the interval on which to repeat launching of the DCT 620, the number of total times to launch the DCT 620 if it is non-infinite, whether the DCT 620 is scheduled at all or is only user launched via the tray tool 510, and whether a tray tool 510 is used with the particular client agent 202 as configured and defined by the system administrator or customer.

The nodes used by the client agent 202 processes can be the definition node-pair 602, 604 (e.g. a local sender and a listener 310, 314), the main collection data node sender 606 plus a metadata, or log node sender 608 (e.g. a local sender 320). As described above, these nodes are classes that encapsulate the communication process provided by the chosen transport layer, here JMS, and are utilized to abstract the data collection process from the physical transport layer implementation. The collector scheduler process 612 can also include the code required to determine what the collection schedule 800 should be, what the current time is and to check the collection definition for new information. The collection scheduler process 612 can launch the Data Collection Task ("DCT") 620 and the Definition Checking Task 616 at the appropriate time, using a set of timers which launch timer tasks. In the exemplary embodiment, the timers 614, 618 can be objects upon which tasks can be scheduled to run at a desired time and or at a desired interval. During operation, the collection scheduler 612 first retrieves the latest collection definition object from a definition message sent by the Definition Server 216 and determines if the definition is configured to run immediately or if the tray tool has set the "Run Now" flag. If either case is true the collection scheduler 612 schedules the DCT 620 to run immediately. Otherwise, the schedule definition 800 is extracted from the full system definition object. This schedule definition 800 can contain the defined collection launch time and interval which can be used to schedule the DCT 620 on the data timer 618. Next the definition checker task 616 is scheduled to run on the definition timer 614 at a repeated interval. This interval value can be stored as a configuration setting. The definition checker task 616 is a small background process that is run on an interval with the intention of keeping the client synchronized with the latest collection definition and corresponding schedule. As the definition checker task periodically runs it retrieves the current definition from the full definition object which was sent by the Definition Server 216, using a definition message processed by a node pair, 310, 314 and then compares the retrieved and current in-memory definition launch times and reschedules collection if needed.

FIG. 9 is a diagram of a remote agent 202 node sender/listener pair 326, 900 with a collection node sender 310, 902 and a collection node listener 314, 904. The node sender 902 and the node listener 904 may communicate through the message channel 318 using JMS messages over the Internet 110 or the like. The node sender/listener pair 326, 900 is configured to encapsulate the transport layer utilizing abstract messages as objects to hide details from node classes. Both the node sender 902 and the node listener 904 use a message controller 908 to create abstract messages as well as get or set any of the message's contents. A node type can be a sender 902 or a listener 904 and the message can be one of many types. The collection node sender 902 communicates to an abstract destination or channel which in an exemplary embodiment is either a JMS topic 402 or a queue 404 (FIG. 4). There is a separate thread for the node listener 904 that is synchronized by a node state 306, 906. The node listener 904 implements the java "Runnable" interface to allow for easily launching it as a separate thread from the node sender 902. Nodes can work in pairs 326, 900 to send and receive messages. In the exemplary embodiment, a NodeState 306, 906 can be implemented as a shared memory object that contains the status of the communication channel 318 that the node pair is communicating over. The NodeState 306, 906 can be used to communicate any state information between the node sender 310, 902 and node listener 314, 904, particularly information that must be synchronized across their separate threads (i.e. when the listener is active and capable of receiving such that the sender knows it is safe to transmit).

Figure 10:
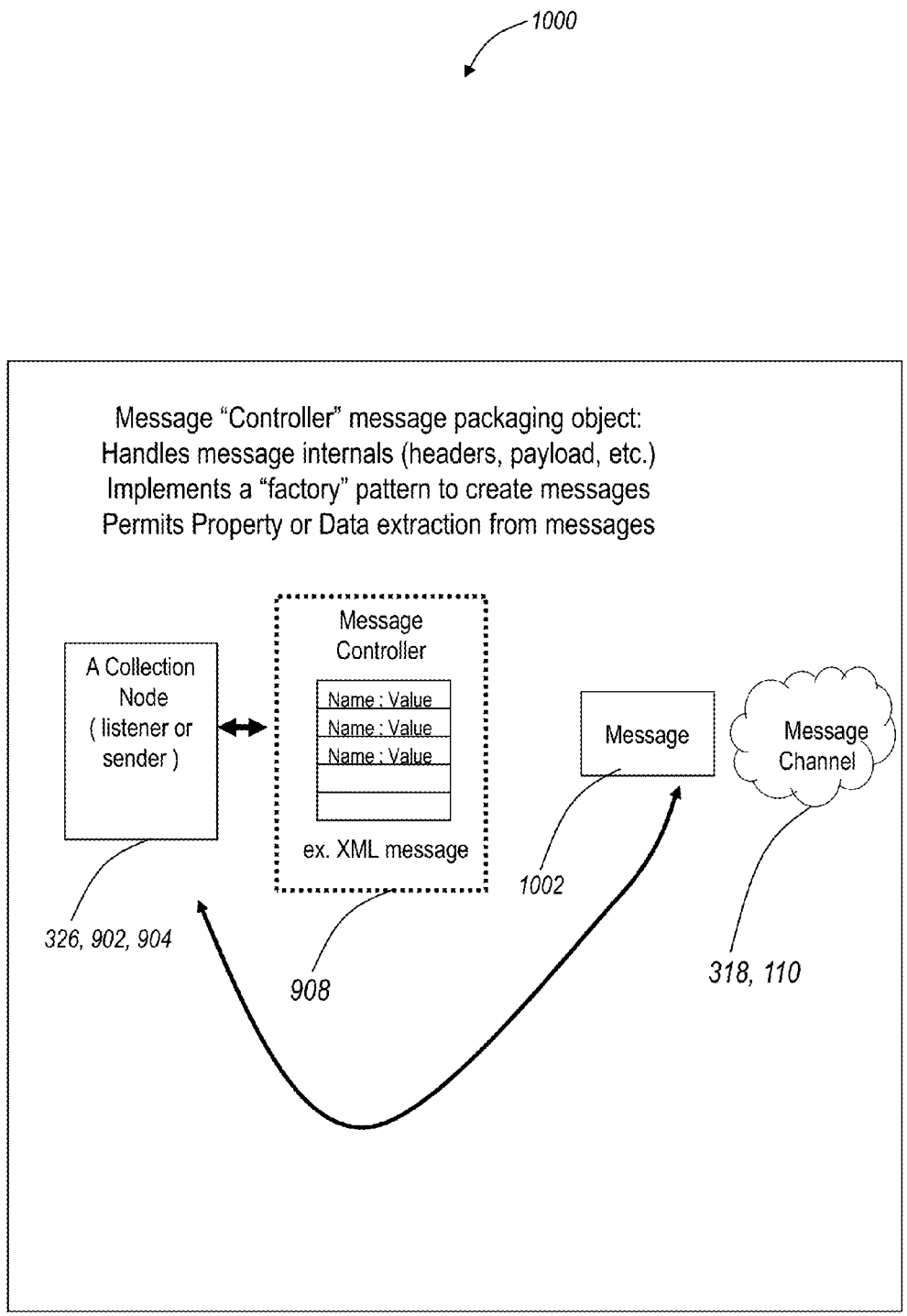
FIG. 10 is a diagram of a message controller object.

FIG. 10 is a diagram of a message controller object 908, 1000. In an exemplary embodiment, the message controller object 908, 1000 can be implemented as a message controller abstraction layer that produces both data and metadata control messages. The collection node, i.e. either a listener 310, 904 or sender 314, 902, interfaces with the message controller 908 to create a message 1002 for transport on the message channel 318 using JMS or the like over the Internet 110. The message controller 908 handles message internals, such as header, properties, payload, etc. This message handling abstraction is accomplished by implementing a standard factory pattern to construct messages and additionally exposing functionality to facilitate property or data setting or extraction from messages 1002.

Figure 11:
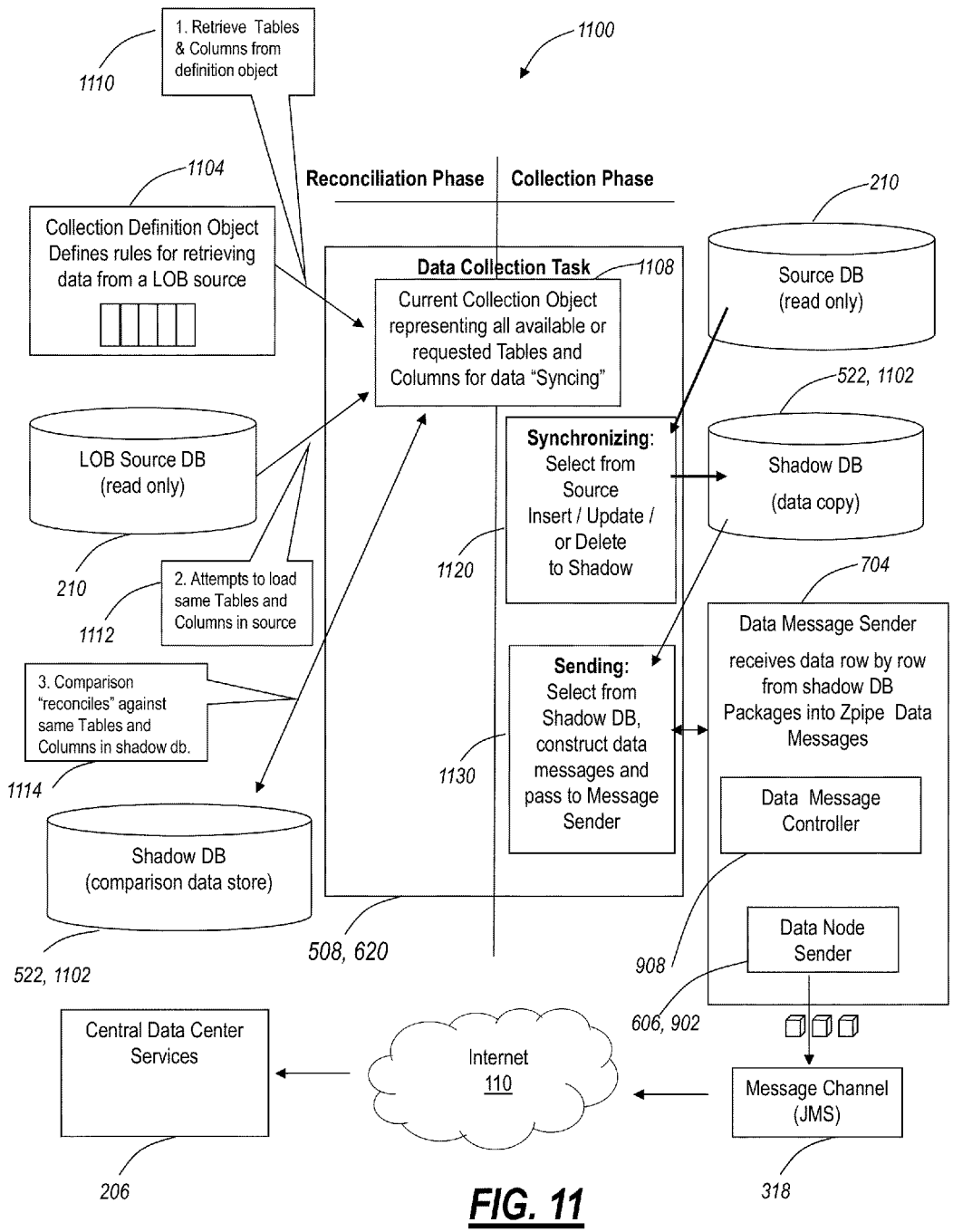
FIG. 11 is a diagram of a data collection task process.

FIG. 11 is a diagram of the two phases (reconciliation/collection) of a data collection task (DCT) process 620, 1100 which is a key component of the present invention. The DCT process 620, 1100 is a sophisticated internal process that uses two phases to accomplish its work. The first phase, reconciliation, has three key steps which determine what data to extract 1110, and how to successfully extract it 1112, 1114. Step 1110 is used to retrieve the most current set of collection rules stored within the definition object 1104. Retrieving 1110 these rules enable the remote data collection system 200 to extract the requested data via a reconciliation process 1114 which first compares 1112 the set of requested data 1104 with the current state of the LOB database 210 to dynamically build a current collection object 1108. Depending on the current state of the LOB database 210, and the outcome of step 1112, the comparison step 1114 may need to alter the selection method to extract the data by dynamically generating additional data retrieval statements. The step 1112 attempts to reconcile LOB database schema defined by current collection object 1108 with the same tables and columns in the shadow database 522, 1102 if the shadow database already exists. Alternatively, if the shadow database does not yet exist, it is created from the database schema, tables and columns, defined by the current collection object 1108. The comparison process is repeated for the local shadow database and any differences between the LOB database 210 and the shadow database 1102 are identified to make the shadow database safe for handling collection data through generation of the dynamic data synchronization scripts (step 1112, 1114) using the current collection object 1108. After the reconciliation phase is complete the DCT process 1100 can assume that the requested data may be safely and accurately extracted from the local LOB database and copied into the shadow database. At the end of the reconciliation phase (step 1114) the current collection object 1108 represents all available tables and columns for data synching and the shadow database 522, 1102 is ready to process local data and extract the requested data set for sending to the DC 206. Step 1114 is a unique comparison operation which may dynamically generate new data extraction rules or alter existing rules or do a subset of the collection rules. That is, step 1114 is used to ensure that the collection system 200 attempts to accomplish the maximum amount of work and extract as much data as is possible given the current state of the LOB database 210, the current version of agent 202 code and the rules defined by the current definition object 1108. This novel and unique feature ensures that the system 200 can operate in a lights out and automatic manner or fail gracefully in the event of non-optimal conditions. In the event of any incomplete collection run 1100, any errors or status messages that occur may be logged and collected centrally in order to generate exception reports 226 to alert the central administrator. These exception reports allow the central administrator to prepare updated definitions or collection rules which can successfully overcome any changes made by the remote system, including schema changes to the LOB database 210 without local user interaction or impact. Once the comparison/reconciliation phase is complete, the second phase of the collection task process may proceed. The collection phase performs the current set of achievable work, defined by step 1114 and the current collection object 1108, which will extract the set of synchronized and requested data from one or more local LOB database(s) 210. Once the data and definitions have been reconciled, the collection phase of the DCT can start. During the actual collection phase, the process may be broken into two steps. The synchronization process defined in step 1120 uses "read only" command statements, which may be dynamically defined by the DCT reconciliation phase, to extract the collectable data. The data extracted by the synchronization step 1120 is copied into a local "shadow" database 522, 1102 which may be dynamically re-created during each run of the collection process 1100. Step 1120 selects data from the local source database 210 and inserts, updates, or deletes the corresponding data in the shadow database 1102. An important implementation within the shadow database 1102 includes the ability to track or mark data for the sending steps 1120, 1130. The data values stored in the shadow database can be marked by metadata to distinguish between existing data, modified data, deleted data, or new data, in order to facilitate a more intelligent and efficient remote data collection process. The completion of step 1120 brings the shadow database into sync with both the changes made to the local LOB database 210 as well as requests for possibly new data defined by the administrator using a new definition object 1108 which may not have been previously collected. The final step of the DCT process is the sending step, 1130, where requested collection data defined by the collection definition object 1104 is retrieved from the shadow database 522 and packaged for transport using the message handling abstraction layer 1000. The sending step 1130 can work in various manners utilizing the data marked by metadata attributes stored in the shadow database 1102. The sending modes may include a "re-send all" data retrieval mode, a send "since" a certain date/time mode, or send only "changed or new" since the last collection run mode. The sending step 1130 extracts the required data (e.g. new, changed or deleted data) from the shadow database using a simple row by row process and passes each row over to the Data Message Sender ("DMS") class 704, which packages data into messages 1002 of the size defined by the definition object 1104. The DMS 704, uses the message controller 908, to package chunks of data into appropriately sized messages for handoff to the data node sender 606, 902 which then uses the message channel 318 for message transport.

A unique ability of the collection process 1100 and the other processes described herein is to not interfere or corrupt or modify the requested collected information from any of the specified data sources. That is, the collection processes 620, 1100 can be operated in a non-intrusive manner with respect to the source DB 210 so as to prevent interference, corruption, or modification of data with the source DB 210. Specifically, the remote data collection agent 202 works in a "read-only" mode that copies requested data to extract it and process it for comparison and transport. This read-only capability is enhanced without the need to modify the existing LOB or software application or data source. Thus the simplicity, safety and reliability of the system enhance the unique value of the remote data collection system and methods.

Further, another unique capability of the remote collection systems and methods includes the ability to treat almost any type of software, system or data file as an extractable data "source". For example, a wide range of supported data sources includes text files, spreadsheets, traditional SQL databases, Indexed Sequential Access Method (ISAM) files or flat files and the like. An additional unique attribute is the ability to wrap a standard Internet "Web-Service" (WS) and treat it like any other data source that is supported or consumed by the remote data collection agent. Thus the system flexibility and support for a wide range of heterogeneous data sources.

The flexibility provided by the reconciliation phase of the Data Collection Task (DCT) process 508, 620 is one of the unique features of the present invention. The DCT 508, 620 can be viewed as containing two primary components, or abstraction layers which are labeled the Reconciliation and Collection phases but this is an abstract design model which may be implemented in various ways by system agent 202 depending on the nature of the LOB application 208 or database 210 or API used to retrieve data. In general, the Reconciliation phase of the DCT 620 process performs the unique and novel functions of the process steps labeled 1110, 1112 and 1114. The data collection process 1100 can begin with the extraction 1110 of collection rules data from the full collection definition object 1104 to learn what data is requested by the central administrator from the local LOB database 210 and how to extract the data. In the exemplary embodiment, the DCT 620 facilitates extracting data from the local LOB 210, by first testing 1112 to see if it can extract the local LOB database 210 table and column names defined by the collection definition object 1104 as indicated by the first step in the reconciliation phase 1110. This step 1112 is used to verify that the local LOB database 210 has no local data access issues which may have been caused by changes to the LOB database schema caused by upgrades, patches and manual editing and the like. If the data access step 1112 is successful, the DCT 620 process reconciles the state of the local database 210 with the state of the shadow database 522, 1102, selecting as much data as was requested and available given the current state of the local database 210. The comparison step 1114 of the Reconciliation phase performs any processing or comparison of rules or selection statements in order to select only those data values which match the current collection object 1108. The Reconciliation phase of the DCT 620 process can also use the local shadow database 522, 1102 to prevent the resending of redundant or previously collected data. This de-duplication process can be performed on either the server 304 or the client 302. Alternatively, the de-duplication process is performed at each remote site rather than the central DC 206 to facilitate parallelizing the process performed at the client 302 and not the central server 304. An additional alternative implementation is to utilize the local LOB API (eg. QuickBooks XML API) to perform a similar data filtering function provided in steps 1112 and 1114.

In an exemplary embodiment, the DCT 620 can enable the system 200 to extract data from the LOB database 210, copy it to a local shadow database 1102, extract the required data and package it for handoff to the message transport layer 318. The DCT 620 may connect to the local LOB database 210 via a Java Database Connectivity (JDBC) connection or some other LOB proprietary application programming interface (API) such as QBXML for QuickBooks. The DCT 620 can be scheduled to run via the timer 618 created by the collection scheduler process which was auto-started by the JVM and launcher process 504. Thus, the DCT 620 can be activated when needed or requested. Once the DCT 620 is activated, the DCT 620 can retrieve the current and latest schedule definition each time it runs to receive the most current definition of what actions to perform step 1110. Each time the DCT 620 runs, it can extract 1112 the requested data from the local LOB database 210 and prepare the shadow database 1114 while comparing it to previously collected data in order to determine which data values are new, changed or deleted since the last collection time. The decision of what to collect, such as, but not limited to, new, new plus changed data, all data including new, changed or deleted, etc. is accomplished using rules defined by the definition object 1108. The comparison step 1114 facilitates identifying the changes in the local LOB database 210 since the last collection process was run and therefore makes the process 1100 efficient by only extracting and sending the specifically requested set of new information. The DCT 620 can also log status information 214 both locally and remotely to the server as it processes, or inserts the data into the shadow database 1102. To log status data 214, the DCT 620 can send a log message which can be retrieved by a listener node servicing the MetaLog Server 228, which inserts them into the central log database 230. A log entry allows the central administer to generate reports 226 and set alerts for any remotely generated errors and provide proactive management to solve any potential problems. Additionally, the DCT 620 sends any client side java exception messages to the MetaLog listener node for logging in the event that any problem occurred (e.g., the local database is missing/moved, corrupted or locked, etc.). Note that the local log entries are also sent as part of the remote data collection process, which provides a hands-off or lights-out remote data collection process. The log files can be centrally managed 226 and reported on to identify any problems which can be fixed with definition or update changes.

The DCT process 1100 can run using a variety of implementations to make it abstracted from and run independent of any specific LOB database engine, such as, but not limited to SQL Server, Oracle, MS Jet, Paradox, Dbase, etc. This database ("DB") abstraction layer may be implemented in the reconciliation steps 1112, 1114 to wrap deficiencies in the native LOB data access layer or the shadow database storage mechanism. For example, a LOB data access layer may provide non-standard names for columns or tables or truncate these names as well as return incorrect column properties such as NULL for non-NULL columns. The DCT data access wrapper layer handles and corrects for these conditions using a dynamic SQL statement generation object which objectively represent an abstracted view of either the local LOB database or the shadow database. For example, a Paradox JDBC driver may lack specific JDBC features, but it may still be supported by the DCT process because the DCT DB abstraction layer implements the source and destination collection databases as objects. This data object representation is used by the DCT process to drive the proper generation of SQL statements to ensure that it can work correctly with both the local and shadow database to provide unique database independence capabilities. Moreover, the DB object abstraction layer is used to extract the current LOB data and compare it to the local data in the shadow database 522 (i.e. the last collected data) using the rules in the collection definition object without depending on the local database engine feature set. The comparison can be performed by a separate database stored within the existing local LOB database 210 or in a separately installed shadow database 522, 1102 engine that is transparent to the local PC or user. The database abstraction layer also supports creating or re-creating the entire local LOB database 206 in a separate shadow database 522, 1102 on a per table basis. In one embodiment, the database abstraction layer flushes the current temporary local shadow database 522, 1102 with a complete new copy of the current LOB data via steps 1112, 1114. The database abstraction layer also supports resending data from the local data store on a timestamp basis in the event of communication loss, packet corruption or DC 206 operational loss. Thus, the DCT process 1100 has a robust set of data connection, abstraction, comparison, re-transmitting, resending and error handling features required by a true automated, remote and lights out remote LOB data collection process.

In the exemplary embodiment, the implementation of the comparison function via steps 1112, 1114 handles a variety of traditional comparison functions as well as a large set of special "edge cases", which occur due to the variance of many LOB applications and how they are implemented in various databases and data schema versions or variations. The ability to extract existing LOB data 1110, 1112 and compare it 1114 to rules defined by the central configuration server via the definition object 1104 allows for easy and non-DBA or IT administration of the remote data collection process. The comparison process can use the key design concepts of separate comparison metadata tables and destination or data store tables. The structure of these data tables enables the comparison process to perform quickly and efficiently on the client side and these table structures (i.e. schema) are reconciled, or updated, to the current collection definition on each collection run. Note that the DCT collection process 1100 can use the comparison function to perform reconciliation between the table column in the definition file and the existing, or local, table's column in both the source and shadow databases. This technique allows the DCT process 1100 to safely capture newly requested data, such as, but not limited to, new columns or values and to notify the central server when the local database has changed its schema definitions. For example, the comparison and reconciliation process can notify the central administrator that a specific local LOB application was upgraded and that it now stores additional data previously not collected. This table definition comparison allows the DCT process 1100 to dynamically adapt to either missing or added columns and reconcile the current local schema to the collection definition request without interrupting the current collection run. The comparison function 1114 facilitates the reconciliation phase process which prevents minor database schema changes from causing an error loop that results in continuous cycle of data retrieval and error reporting, which would overwhelm the DC 206 servers. As a result, customers can be safely provided with data while providing peace of mind and confidence that minor application or database patches will not stop the flow of data collection. Additional error and exception handling code allows the collection process to adapt to local database conditions such as the corruption of individual rows within the source database or to prevent corruption of the shadow and remote datacenter databases in the event of changes to the local LOB database 206 primary keys or other schema elements. Thus, the comparison function can retrieve the current database column definitions that exist in the local database (e.g. the current local LOB database schema 210) source tables each time the DCT process 1100 runs to ensure that local changes are reconciled with the shadow data 522, 1102 and the collection rules 1108. This feature enables data collection reliability, and prevents errors due to variations in local LOB database 206 schemas and data content across a wide range of independent, remote sites.

Once the reconciliation process is done, the end result is a pared down representation 1108 of the collection definition's table and column objects. Another unique feature is the use of these objects to dynamically generate the local SQL scripts that perform the source data retrieval and the shadow database insert/comparison function without depending on triggers, stored procedures or other database software logic contained within the local LOB database 210. The DCT process 1100 can also utilize a dynamic source and/or shadow database driver that may be embedded in the definition to aid in the SQL script generation. This feature allows for flexibility and cross-database implementations to handle changes or inconsistencies with data types, keywords or other database attributes which can occur between vendors. Note that the DCT database abstraction process does not allow for arbitrary SQL statements to be executed on the source database. The DCT script generation and execution engine only performs SELECT type SQL statements, thus ensuring the collection is a read-only process that can not damage the existing LOB database 210. Also note that script generation is automatic because it is driven by parameters defined in the collection definition object 1104. Finally, this layered and abstracted design allows the DCT process 1100 to collect from multiple clients or databases simultaneously. This is useful in hosted environments where a single server may host multiple implementations of a LOB process or where a single LOB application may use multiple databases or where a remote site may use multiple LOB applications and wish to collect from all of the LOB data sources. The DCT process 1100 is abstracted from the implementation specifics of the local LOB database 206 or machine thus allowing a single local agent to perform the entire set of data collection tasks. Finally, it should be noted that by using JDBC or native LOB APIs, the collection process may work independently with multiple source databases that are both local on the machine or at remote machines that may use the Operating System (O/S) file system, network sockets layer or other APIs including Internet webservice calls to retrieve data stored within the LOB database.

The Data Message Sender (DMS) process 704 can use a message controller 908 object to package the collected data into data messages which can fit into the packet size specified by the collection definition object 1104 which may be tuned to match the current transport layer and node sender operating environment. The DMS handles the internals of receiving the source data, determining the current data byte size and utilizing the message controller 908 to package the data into data messages which are sent to the DC 206. The DMS may also notify the correct classes to turn encryption of the data message on or off using the optional data encryption process 706. Once the DMS 704 has a data message of the configured size, it passes the message over to the collection node sender 606 which then utilizes the transport space 318 to reach the data consolidator node listener 322 at the central DC 206. Again, note that all the data nodes at both the client and DC simply know of the existence of the data message as an object without knowing any of the internal details due to the use of the message controller 908 abstraction layer. This type of abstraction implementation allows the actual message formatting to be independent of the underlying communication transport layer 318. In an exemplary embodiment, the system 200 can be adapted to use many other transport layer technologies including other object broker or middleware products. The actual message passing and transmission may be handled by the transport layers 318, including acknowledgement, message persistence, automatic queuing, serialization and retry processing in the event of a communication failure. Any appropriate transport errors are also logged into the local log 214 for later collection into a centralized error log 230 for further analysis and reporting.

An additional exemplary embodiment of the invention is the creation of a "peer to peer" ad hoc dynamic data replication and synchronization system. Since the remote data collection systems and methods have the ability to treat any system as a data source a corollary to this means that any two remote systems may send or receive data to each other. This dynamic data replication and synchronization service is created via the creation of a dynamic command language to determine what data sets to retrieve, how to extract them and compare extracted data to targeted or requested data and send that data to the data transport system. Another aspect of the dynamic peer to peer system is the ability of the invention to dynamically create system "end points" or receiving data "listeners" as needed or specified without administration overhead. Additionally another dynamic aspect of the invention is the ability to dynamically create new or custom data fields as needed in the master or consolidated database. This feature is useful when the various remote system data source structures and metadata schema (data fields, column names, tables and the like) vary between and among the many remote sites. Using dynamically created consolidated data tables allows the system to handle the wide variability and unpredictable nature of remote systems where various "versions" of LOB systems are installed (i.e. inconsistent or different versions are installed across the system) and or when customizations or local modifications have been made to local data sets. Existing systems generally require a common or identical data set model and or they drop the additional or customized data values. The dynamic data source creation is generated by robust information contained within a data message used by the dynamic command language that controls the system's operation to both create a new column and generate the dynamic database language statements on the fly to insert the new dynamic data.

An additional aspect of this invention is the ability to support data collection and or display on modern mobile digital devices such as smart phones, tablets or personal digital assistants (PDAs) and the like. The ability to collect flat files or structured storage across device types in a two way data replication and synchronization scenario enables mobile users to stay up to date with both centralized data sources as well as other remote systems and or mobile users. The dynamic ad hoc nature of the system allows even homogenous devices which have dissimilar data sets stored within supported data sources to make a comparison that identifies the commonality, the differences and exchange requested information between them anytime. This includes support from synchronizing mobile devices with existing LOB systems or devices and allowing the mobile device to become remote terminals to interact with the legacy systems data including configuration settings and or evaluating operating results with dynamic charts, graphs and measurements indicating the current state of the legacy system on the mobile users' device. Examples of this include differences in two users' phone number lists and having the system compare these data sets and synchronize the differences between them including user override or approval of additional data.

A significant aspect of the invention is the ability to replicate data between systems including new "cloud" or Software-as-a-Service (SaaS) systems including "data forwarding" from existing legacy devices by integrating them with cloud based data consolidation systems. Of particular note is the ability for the invention to include other cloud based systems as data sources via the support of WebService as data source. Thus a hybrid cloud architecture can be supported between legacy LOB systems by replicating or sending their data to new cloud systems and or collect from multiple cloud systems into a single cloud system.

Yet another aspect of the invention includes the idea of a "database repeater" or a "dynamic ETL" to move data from one LOB system to another of the same or different type using a combination of the unique features. This improves upon existing "Extract Transform and Load" (ETL) systems that have a fixed taxonomy and fixed understanding of what data inputs come in and how they are mapped or transformed into a combined data source, typically a data warehouse. The system's ability to use a dynamic command language to work on dynamic data sets and extract, compare and replicate them including handling different data source schema variances at the source and dynamically creating compatible destination consolidation sources. Examples include variations in accounting systems "chart of accounts" to categorize similar if not identical items under different labels or identifies or codes and the like. This can be extended to any type of "tagged" or identifiers including Extensible Markup Language (XML) labels or described data sets such as financial reporting under the Extensible Business Reporting Language (XBRL) standard.

FIG. 12 is a table of various Data Message Sender 704 subclass types. Because a key concept of the data collection process 200 is the abstraction provided via the message controller layer 908, the details of the Data Message Sender class and subclasses 1200 are provided here for clarity and design completeness. Specifically, the collection process can be built around but is not limited to message class handlers which understand how to create the data or message items shown in FIG. 12. For example, exemplary message sending class types can include Data Message Sender, Data Row Sender, QuickBooks Message Sender, Table Data Sender, and the like.

Figure 13:
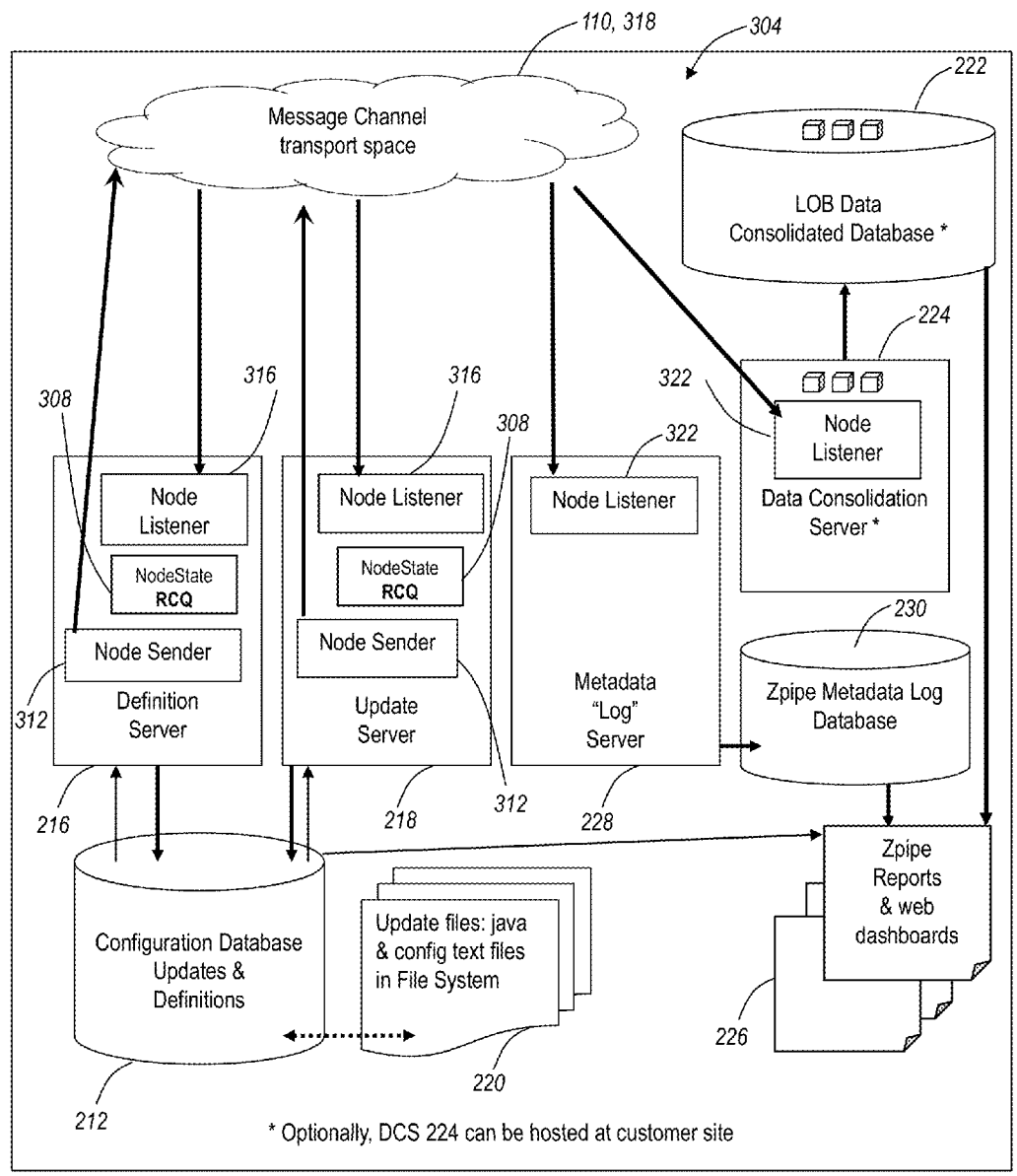
FIG. 13 is a diagram of a server side of the remote data collection system.

FIG. 13 is a diagram of a server side 304 of the remote data collection system 200. Note that the DC 206 architecture illustrated in FIG. 13 is merely an exemplary implementation, and those of ordinary skill in the art will recognize other implementations are also contemplated by the present invention. The server side 304 of the process can be seen as implementing a mirrored set of node-pairs as the client side 302 but with some extensions to the message queuing along with alternative deployments of the consolidated database servers 222, 224 to customer sites while still maintaining the central definition, update and log handling databases at the main DC 206. The server side 304, or DC 206, of the remote data collection system 200 can be abstractly modeled as shown in FIG. 13. Note that the standard JMS services and JVM code are not shown.

Figure 14:
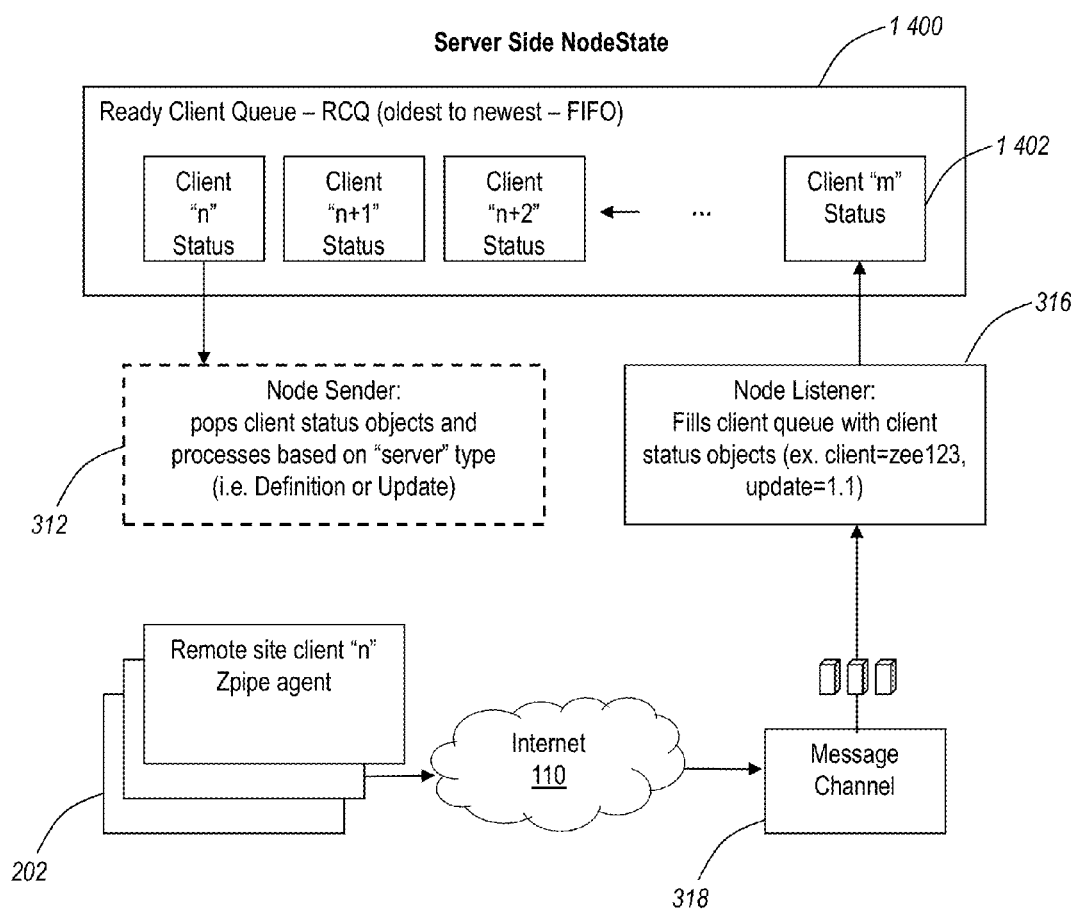
FIG. 14 is a diagram of a ready client queue object.

FIG. 14 is a diagram of a Ready Client Queue object 1400. In general, the server side 304 of the system 200 can implement a matched set of node listeners 316, 322 to the remote clients 302. Moreover, the servers also extend the node listener 316, 322 objects to provide enhanced features not needed on the client side 302. These server side 304 extensions can include the ability to load their database and JMS connections from server specific configuration files which allow an administrator to quickly and easily launch either a single or multiple set of server instances by changing a few configuration settings. The definition and update server 216, 218 listener extensions also introduce another key feature called the Ready Client Queue ("RCQ") object 1400 which can be stored in the shared NodeState 308 object on the servers. The RCQ 1400 may be used by the update and definition servers to facilitate processing message requests from multiple simultaneously connected remote agents 202. Since each part of the server's node sender/listener pair are operating on a separate thread, the RCQ 1400 may be used as the synchronization point through which these independent threads communicate and coordinate their operation. While many client agents 202 can simultaneously send definition request messages, the definition server listener node 316 takes each of these requests as they come in and places their current client status 1402 information into the RCQ 1400. Conversely, the definition server sender node 312 monitors the RCQ 1400 and pops each client's status information 1402 out of the queue when it is ready to process the next client status. In this manner neither half of the server is waiting for the other. Rather they both operate as quickly as they can. The update server 218 uses a similar model to handle update request messages. Again, the definition and update servers 216, 218 use a RCQ 1400 to process client status 1402. The listener nodes 316 on the data and metadata log servers may not need to implement a RCQ as they may receive client data messages directly from a transport space 318 message queue 404 and immediately extract the data from the message and process it for insertion into the collection or log databases.

FIG. 15 is a table describing some of the collection definition object 1104 attributes and metadata 1500 which can be stored in the configuration and definition database 212. The collection definition object facilitates telling the agent 202 what data to collect and send, by defining what LOB database 206 to connect to, which tables and columns to collect from and the actual records to collect (e.g. new, update only, all, etc.) or alternatively which API method(s) to use to access the LOB data 206. These definitions may be stored as records in a definition server database 212 which can contain definitions for multiple sites, groups of sites, multiple LOB applications at a set of sites and for multiple collection customers. The definition records may be stored in the definition server with one definition record per Zor (or type of remote collection customer) for each local LOB database 206 or table to collect from and or for specific "edge case" schema variation or local operating condition. The definitions may be implemented by extracting key LOB and database properties and storing key settings in the configuration database. Thus the definitions provide a central repository to control all of the remote data collection configurations even across multiple Zors or business models and across many types of LOB applications. The collection definition message object 1104 contains many detailed data definitions which drive the configuration and operation of the remote data collection process during steps 1110, 1112, 1114 of the DCT process.

Figure 16:
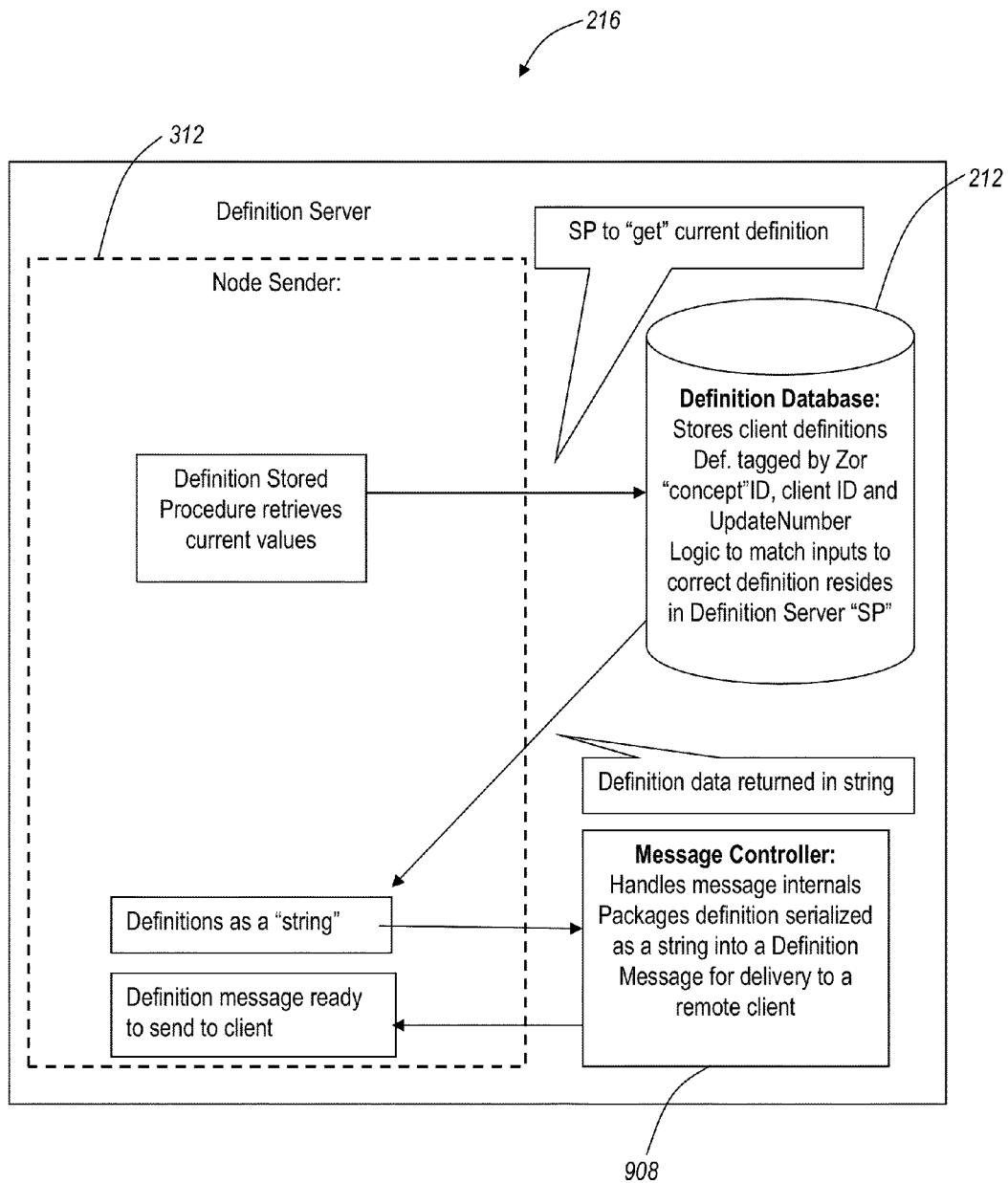
FIG. 16 is a diagram of the definition server.

FIG. 16 is a diagram of the definition server 216. Each remote client agent 202 may check their definition by sending a definition request message at remote agent startup to the definition server 216 where the listener node 316 processes the definition request message containing that client's current state. The definition server listener node 316 uses a message controller 908 to extract the remote agent 202 current client status 1402 and place the status into the NodeState RCQ 1400. The definition sender 312 process pops the client status 1402 from the RCQ 1400, extracts properties and processes the client definition request by retrieving the current client definition directly from the definition database 212 using a set of stored procedures. The definition sender uses the client status information to populate a stored procedure (SP) SQL statement which is executed on the definition database 212. The SP returns the matching definition for the specified client as a "string" (i.e. a serialized version of definition object). The server node always sends a definition message back to the client in response to a definition request message. Also note that the definition server sender node does not know the details of both the definition rules object 1104 and the definition message 1002 due to the use of message controller 908. Thus the central storage of the definitions and the use of messages allow a single administrator to easily monitor and direct the operation of every remote agent 202 by simply managing the central definition configuration database 212. Administratively targeted remote clients may receive new definitions containing new or changed collection instructions via the collection definition object 1104 in response to a definition request message. A similar architecture is used by the update process, allowing the current collection agent code files to be sent to remote sites, easily updating the remote code. FIG. 16 shows how the Definition Messages are processed using a database stored procedure ("SP") after the client status 1402 have been popped from the RCQ 1400.

Figure 17:
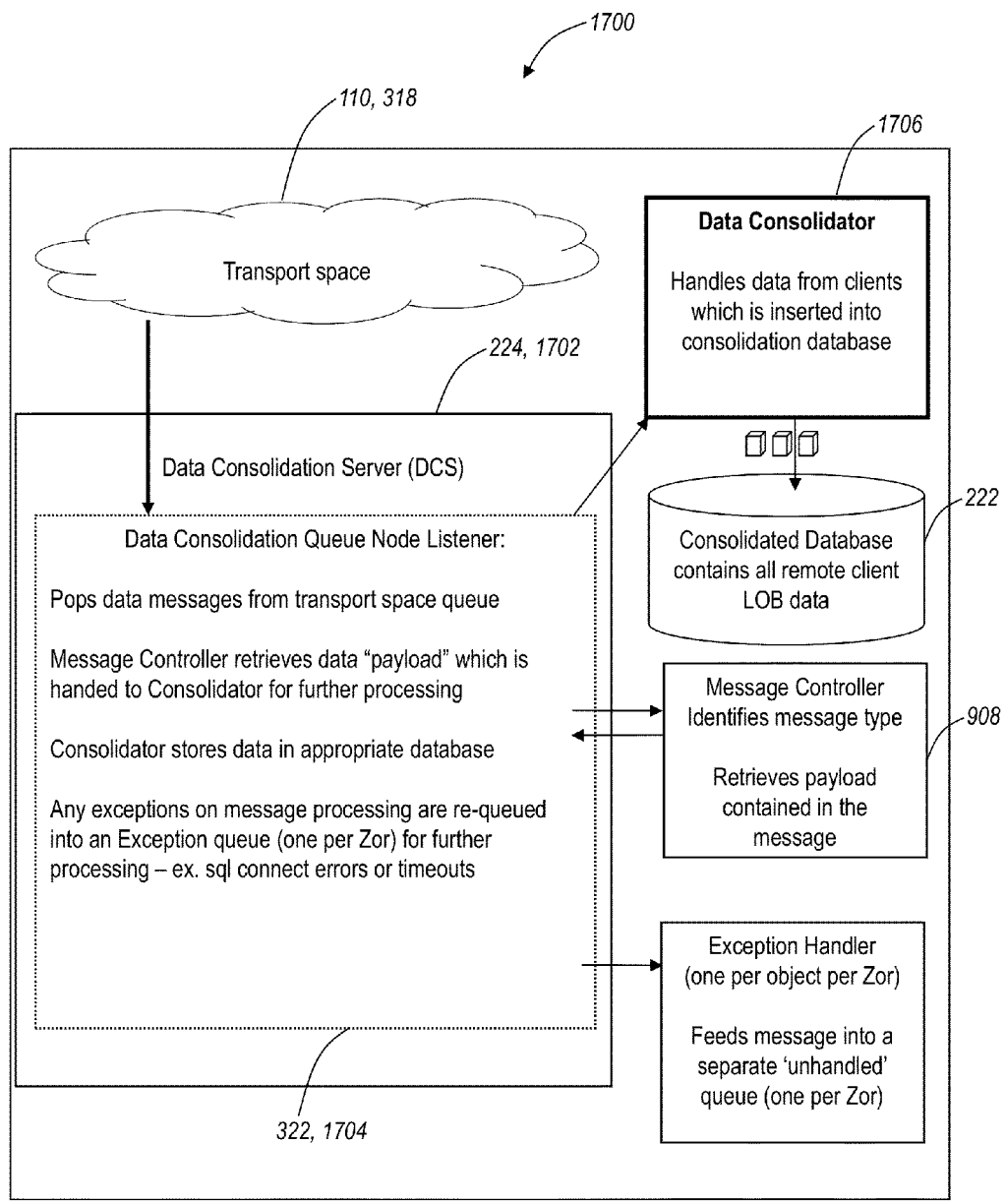
FIG. 17 is a diagram of a Data Consolidation Server (DCS) process.
Figure 18:
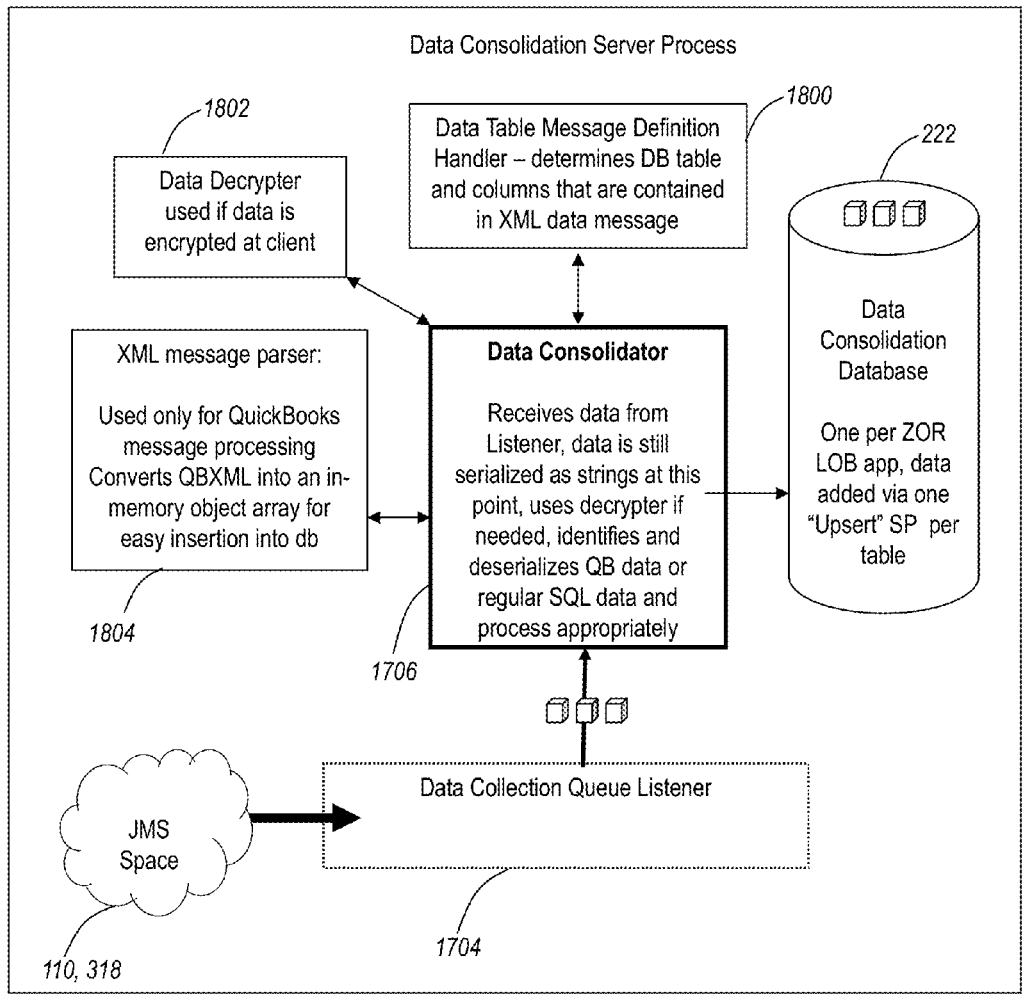
FIG. 18 is an additional diagram of the DCS process.

FIG. 17 is a diagram of a Data Consolidation Server (DCS) process 1700. FIG. 18 is an additional diagram of the DCS process 1700. In the exemplary embodiment, the DCS process 1700 is a server side process 224 where at least one DCS server 1702 can be setup to collect data from the remote client agent 202 at each remote site. In one exemplary embodiment, the DCS 1702 can be self-hosted by the Zor, or customer, while the other servers 216, 218, 228 may reside at the DC 206. The DCS 1702 facilitates processing the client side data messages, which may contain LOB collection data 210, and insert the data messages into the appropriate central LOB consolidation database 222. In one exemplary embodiment, the data communication may be one way (i.e. from the client to the server); however, the definition and update messages flow both ways. In an alternative embodiment, it may be possible to send data back down to the remote client. Alternatively, the process 1700 may utilize a two-way data communication process using a data node sender on the DCS 1702. This type of feature may be supported using the extensible messaging model. Also note that in an exemplary embodiment the transport layer space 318 may be implemented to utilize the JMS service to provide "guaranteed delivery" of any messages sent by the client 202. For example, the JMS layer may re-try, or resend messages, in the event that the client has been disconnected from the central DC JMS service. Once the data messages are received by the server side JMS service, the messages are placed into the appropriate server JMS queue 404 where they wait until they are consumed by the appropriate sever queue node listener 1704.

FIG. 18 shows a data consolidator 1706 may be implemented using an abstract message controller architecture that is substantially similar to the client side to ensure that message processing is handled independently of the message format and type. The data consolidator 1706 may receive messages from the data consolidation queue listener node 1704 and then it utilizes a data message definition handler 1800 to identify into which consolidation database 222 and table the current message data should be stored. In the exemplary embodiment, additional message processing may be provided to the data consolidator 1706 by a data decrypter handler 1802 or a QB XML message parser 1804 on an as needed basis resulting in a properly formatted data record for insertion into the appropriate consolidation database 222. Note that there can be at least two types of data messages. A data message may contain SQL database record data or a data message may contain an XML data record, which can come from LOB webservices or data extracted from LOB applications like QuickBooks. The database data messages may contain an internal data table definition which may be stored as XML within the message. The data table definition handler 1800 reads the XML data within the data message to identify which table and columns are contained inside the current data message. The consolidator 1706 may then locate and load the same database representation from the consolidation database 222, or from a cache, and reconcile the columns from the message and the actual consolidation destination table. The consolidator process 1700 then calls the "upsert" function, for update or insert, which may be a stored procedure ("SP") statement based on the reconciliation data. The upsert SP is populated with any parameters, or columns, that are present in the data message. Any missing columns are set to NULL and extra columns in the message are discarded. In an alternative embodiment the extra client information may be stored in the consolidation server 222 for later use. Example scenarios which could generate missing or extra columns in data messages may be caused by differences in LOB applications 208 and databases 210, or version numbers, patches or updates to the LOB or local, client specific LOB database 210 schema changes. In one embodiment, for QuickBooks data messages, the QBXML data message contains the raw QBXML as it was retrieved by the QB API from the remote client's QB application database. This unique QB feature necessitates the use of the XML message parser 1804 in order to convert the QBXML format into an in-memory database object representation for rapid insertion into the appropriate consolidation database. In the case of the QuickBooks XML message parser 1804 it does not need to examine the structure of the XML message for missing or extra columns contained within because it is created and validated by the QuickBooks API when it was extracted from the local QB data file. Once the Data Consolidator 1706 has an appropriate database insertion object, the resulting collected data, whether from QuickBooks or any other LOB application, is looped through and the upsert stored procedure is called repeatedly to store the remote client data into the appropriate consolidation database 222. Alternatively, additional data transformations and data warehouse type processing may be applied to the consolidated data including mapping of remote LOB column names to standardized columns to facilitate proper and efficient reporting 226 or faster pre-computed statistics and KPIs for executive dashboards.

Figure 19:
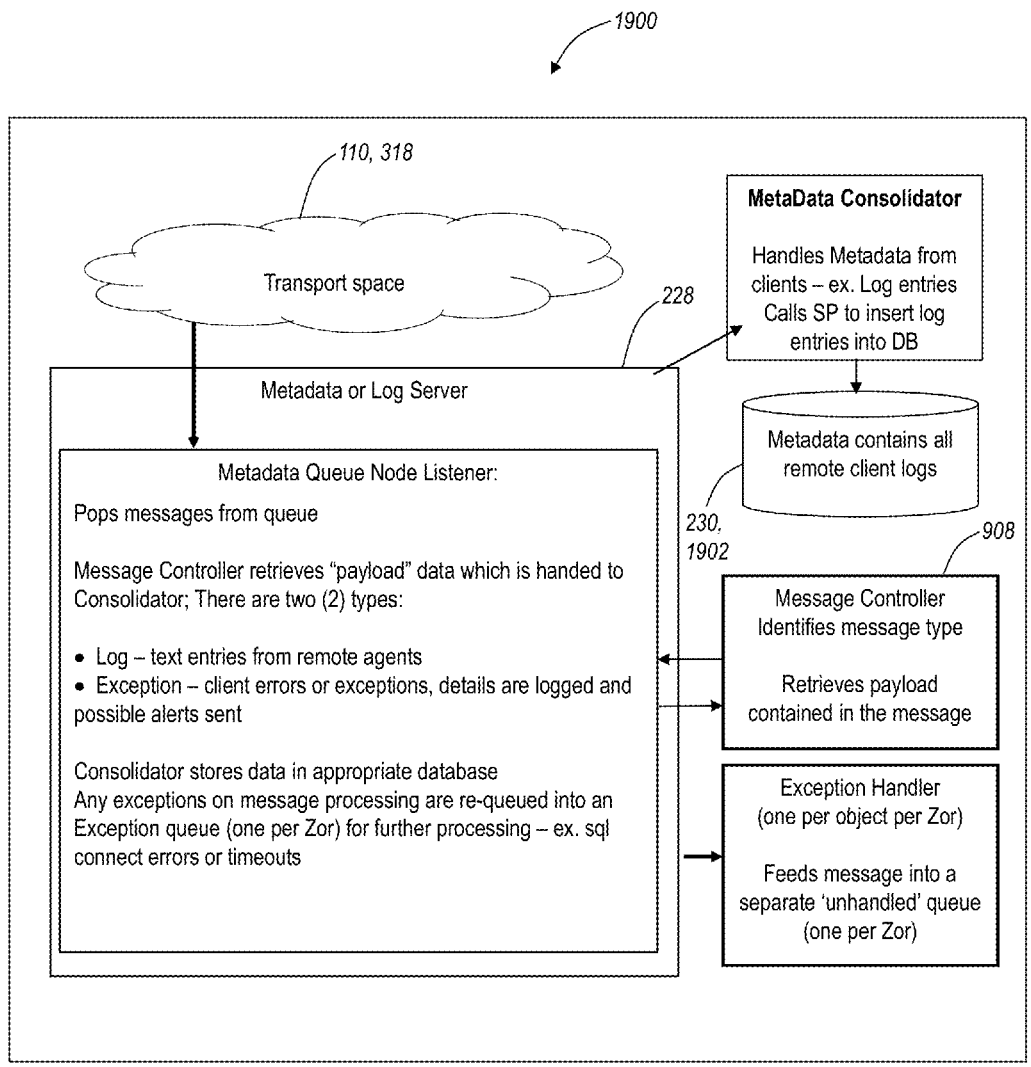
FIG. 19 is a diagram of a metadata, or log server process.

FIG. 19 is a diagram 1900 of a metadata or log server 228 process. The metadata or log server process 1900 may be substantially similar to and perform like the DCS process 1700. The metadata server process 1900 takes client log messages and inserts them into a server side database 230, 1902 to provide a central repository for all of the client agent 202 status messages. The metadata server 228 uses a message controller 908 to extract the message type and values and pass them to the upsert stored procedure to place them into the metadata log database 230, 1902. In the event the exception messages contain more information, the stored procedure consequently has more parameters to populate. With all of the status messages centralized in one database, the administrator may generate notifications, alerts or reports 226 to quickly and efficiently identify any remote agents that may be having problems. In such an event, corrective action can be targeted at the specific remote site by changing the update number, by sending them a new client version and/or by sending a restart message using a new definition or other action at the DC 206.

Figure 20:
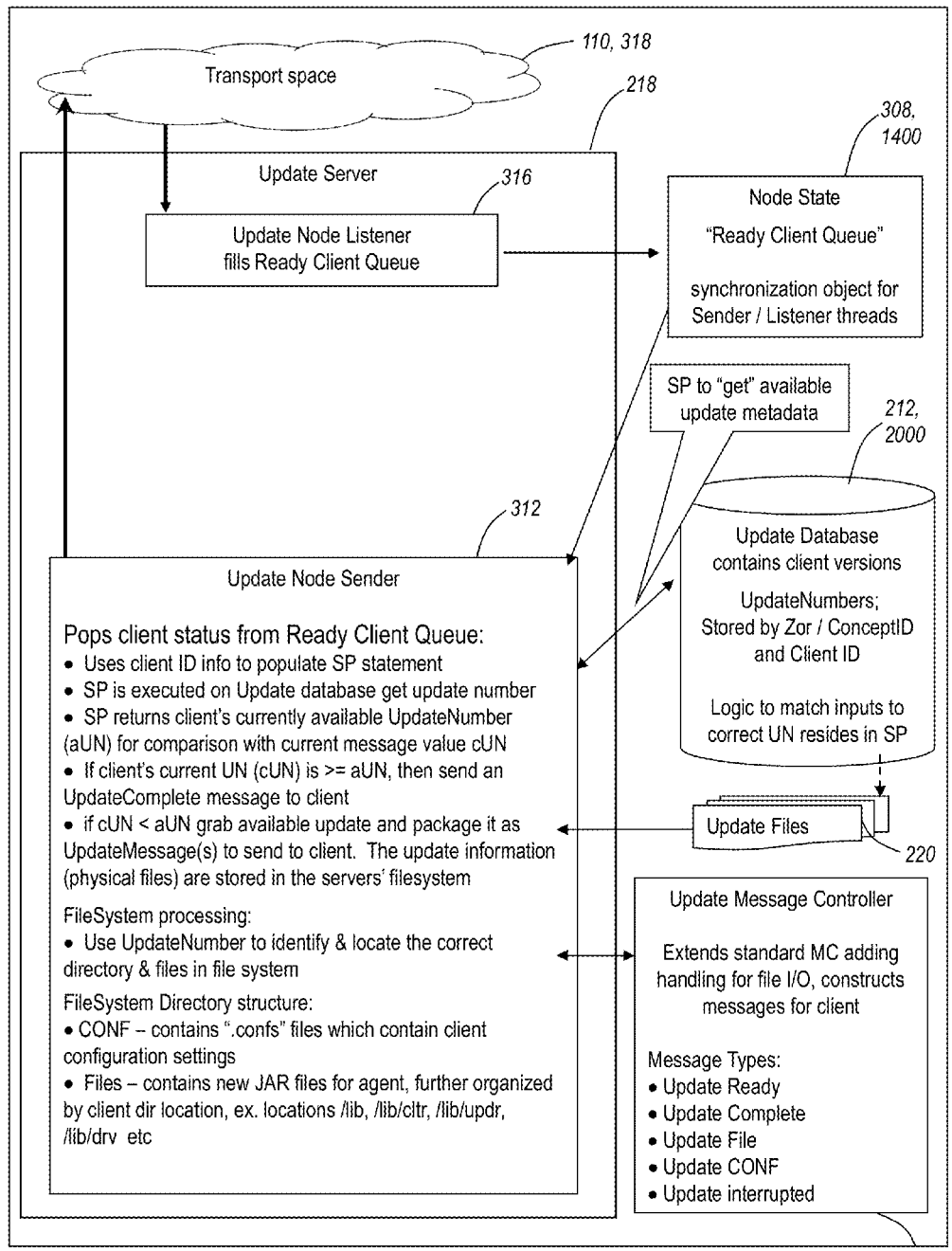
FIG. 20 is a diagram of an update server.

FIG. 20 is a diagram of the update server 218. In an exemplary embodiment, the update server 218 function may be a component of the automated, self-updating, remote data collection system 200. The update server 218 facilitates changing both the code and the collection configuration at the remote site from a central management configuration page. Update releases may be managed from a central point, or update database, located at the DC 206. An update database 2000 stores the metadata which defines which updates belong to which clients or group of clients. In one exemplary embodiment, the grouping of remote clients may be organized based on the specific needs of the agent 202 implementation for their remote LOB application and unique business concept needs, such as territories, tiers, peer groups, etc. The hierarchical rules encoded by the metadata stored in the update database provide flexibility in versioning, grouping, updating and rolling out new versions to a variety of remote clients 202. The update rules also allow for releasing an update to a single client, a group of clients, to all of the clients within a business concept, and/or to every client using a single database record, or Update Number (UN). The use of update numbers to match remote agent 202 to code capabilities allows code updates to cross customers or the entire system 200. After a release is identified in the database by a set of update rules, it can be targeted for distribution to existing clients 202 in an automated manner. The version metadata defining what is packaged as a "version" is stored in the Update Database 212, 2000. Once the list of targets is identified, the updated content is requested by remote clients 202 using the update request message. The update server listener node 316 receives the message and places the client status 1402 into the Ready Client Queue 1400. Separately, the update server sender node 312 gets the next status 1402 and compares the client's current update number to the client's available update number defined or set by the administrator in the update database 212, 2000 and, if needed, retrieves the new version of code and .conf files from the file system 220. Note there may be one update server with one or more ready client queue(s) 308, 1400 per "managed concept" or ZorID. The update server can trigger sending both updated .conf files and or java code jar files. The new client update is then packaged by the update message controller 908 into update messages and the update server node sender 312 hands them over to the destination topic for the identified remote client.

Figure 21:
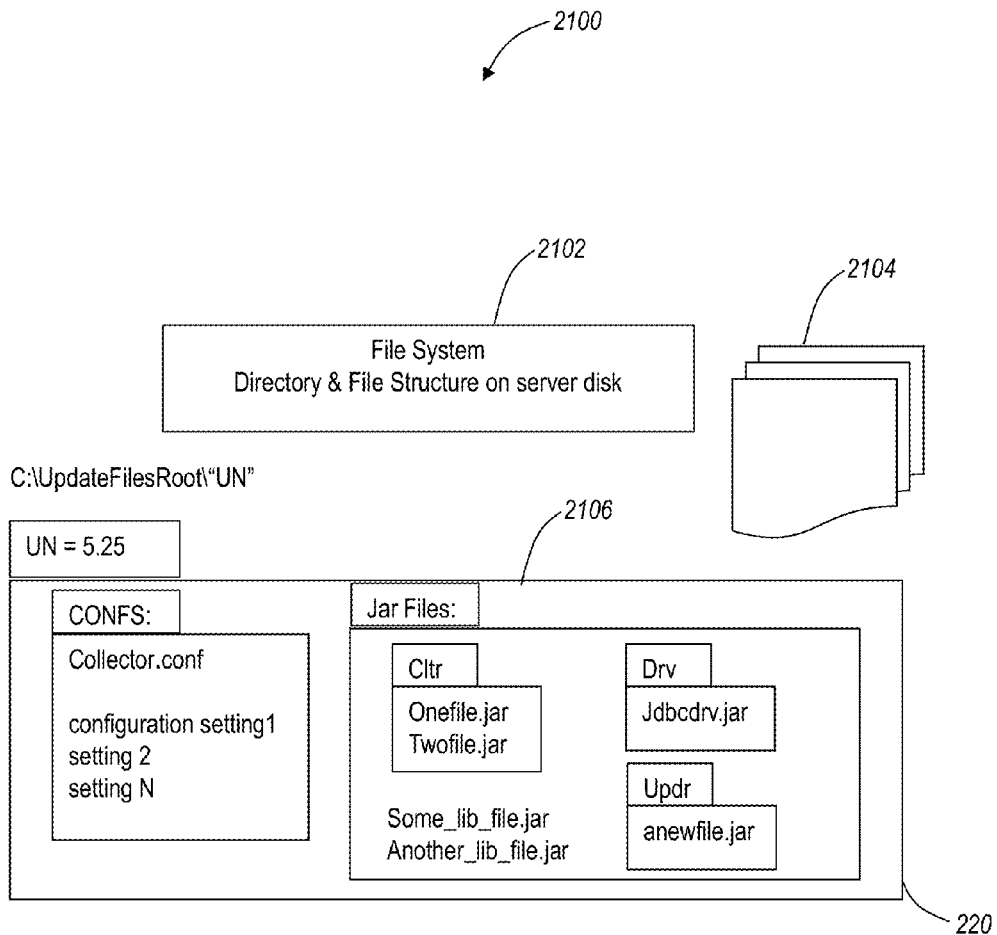
FIG. 21 is a diagram of a DC server file system.

FIG. 21 is a diagram of a DC server file system 2100. In an exemplary embodiment, the update database 212 uses the concept of metadata records 2104 to logically package multiple components (e.g. jar files, .conf files) 2106 into remote agent "versions" by a unique Update Number (UN) which is used to target one or more of the remote agents 202. The metadata concept uses the update number ("UN") 2106 to point to specific groups of files stored on the local server file system 2102 where a single or multiple set of files may make up a new update of the remote system 204. The file system 2102 may store multiple versions of the configuration text files (e.g. .conf files) and java code files (e.g. .jar files), which make up a virtual database of updates 220 which is organized by logically by the update database 212. These updates 212 are used to configure and/or control the agent 202 on the remote client site.

The system updates may be version-controlled in the update database 212, 2000 using the update number. The UN versioning enables specific versions of the agent code to be loaded at the client side using a custom java class loader called the Versioned FileSystem Class Loader ("VFCL"). This process enables the launcher to load the correct update number version of the code file into memory and execute the code file. Moreover, the VFCL may load java classes without maintaining a file system lock on the .jar files, which facilitates updating the client 202 while it is still running in the remote client machine's Java Virtual Machine (JVM). This allows the old client files to be in use but not locked by the file system, allowing them to be overwritten by the new update versions. The VFCL enables the system to run in an automated and unattended manner at the remote site and be maintained by a centralized configuration site using the UN. The VFCL also searches for classes in a pre-defined order, or manner, rather than a default java system class loader search method. Moreover, the VFCL may ignore the CLASSPATH local environment variable settings opting instead to load jar files in a predefined manner, such as from the highest available version of a java class to the lowest available versions. This allows the client 202 to store and use multiple versions of the code files, for example loading the current version specified by the .conf file and additionally falling back to an earlier version of the file if the current version is missing or corrupt.

Figure 22:
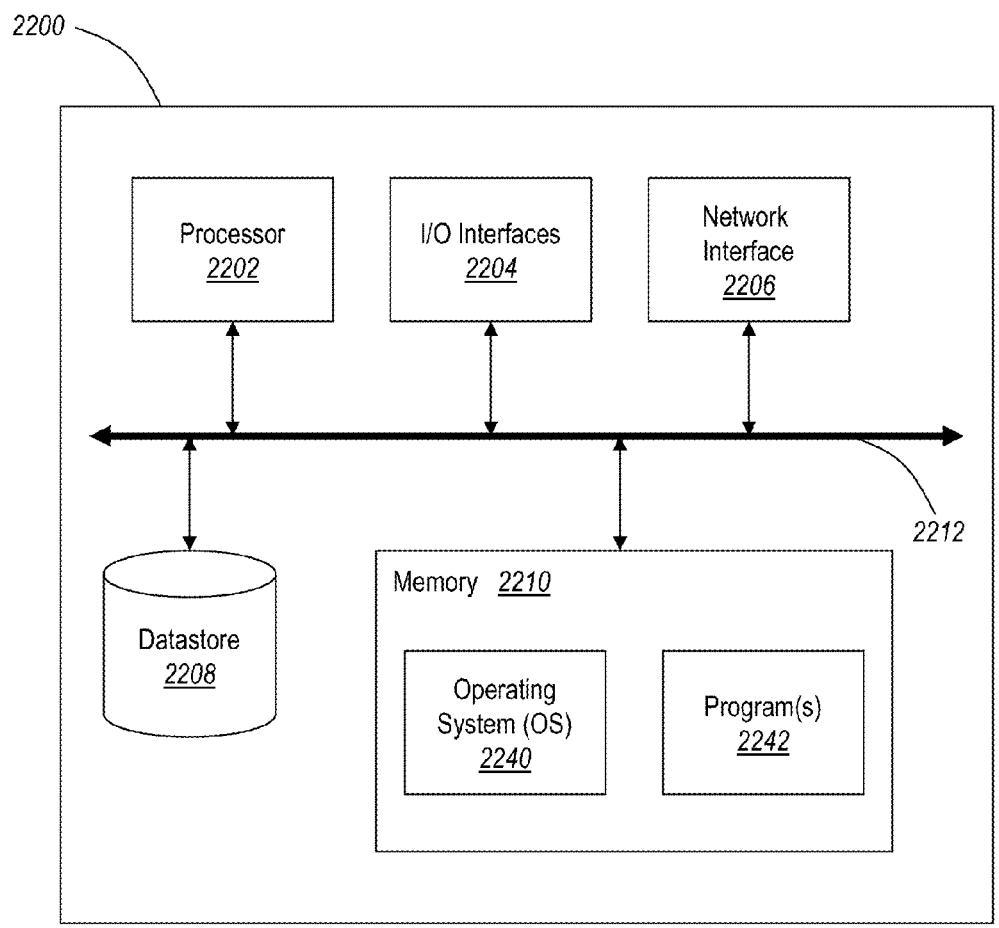
FIG. 22 is a diagram of a computer operating as a client and/or server for the remote data collection.

FIG. 22 is a diagram of a computer 2200 operating as a client and/or server for the remote data collection of the present invention. The computer 2200 can be a digital computer that, in terms of hardware architecture, generally includes a processor 2202, input/output (I/O) interfaces 2204, network interfaces 2206, a data store 2208, and memory 2210. The components (2202, 2204, 2206, 2208, and 2210) are communicatively coupled via a local interface 2212. The local interface 2212 can be, for example but not limited to, one or more buses or other wired or wireless connections, as is known in the art. The local interface 2212 can have additional elements, which are omitted for simplicity, such as controllers, buffers (caches), drivers, repeaters, and receivers, among many others, to enable communications. Further, the local interface 2212 can include address, control, and/or data connections to enable appropriate communications among the aforementioned components.

The processor 2202 is a hardware device for executing software instructions. The processor 2202 can be any custom made or commercially available processor, a central processing unit (CPU), an auxiliary processor among several processors associated with the computer 2200, a semiconductor-based microprocessor (in the form of a microchip or chip set), or generally any device for executing software instructions. When the computer 2200 is in operation, the processor 2202 is configured to execute software stored within the memory 2210, to communicate data to and from the memory 2210, and to generally control operations of the computer 2200 pursuant to the software instructions.

The I/O interfaces 2204 can be used to receive user input from and/or for providing system output to one or more devices or components. User input can be provided via, for example, a keyboard and/or a mouse. System output can be provided via a display device and a printer (not shown). I/O interfaces 2204 can include, for example, a serial port, a parallel port, a small computer system interface (SCSI), an infrared (IR) interface, a radio frequency (RF) interface, and/or a universal serial bus (USB) interface.

The network interfaces 2206 can be used to enable the computer 2200 to communicate on a network, such as to a client or the like. The network interfaces 2206 can include, for example, an Ethernet card (e.g., 10BaseT, Fast Ethernet, Gigabit Ethernet) or a wireless local area network (WLAN) card (e.g., 802.11a/b/g/n). The network interfaces 2206 can include address, control, and/or data connections to enable appropriate communications on the network.

A data store 2208 can be used to store data, such as configuration data and the like. The data store 2208 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 2208 can incorporate electronic, magnetic, optical, and/or other types of storage media. In one example, the data store 2208 can be located internal to the computer 2200 such as, for example, an internal hard drive connected to the local interface 2212 in the computer 2200.

The memory 2210 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 2210 may incorporate electronic, magnetic, optical, and/or other types of storage media. Note that the memory 2210 can have a distributed architecture, where various components are situated remotely from one another, but can be accessed by the processor 2202.

The software in memory 2210 can include one or more software programs, each of which includes an ordered listing of executable instructions for implementing logical functions. In the example of FIG. 22, the software in the memory system 2210 includes a suitable operating system (O/S) 2240 and one or more programs 2242. The operating system 2240 essentially controls the execution of other computer programs, and provides scheduling, input-output control, file and data management, memory management, and communication control and related services. The operating system 2240 can be any of Windows NT, Windows 2000, Windows XP, Windows Vista, Windows Server (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or the like.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The computer system also includes a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system further includes a read only memory (ROM) or other static storage device (e.g., programmable ROM (PROM), erasable PROM (EPROM), and electrically erasable PROM (EEPROM)) coupled to the bus for storing static information and instructions for the processor.

The computer system also includes a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), liquid crystal display (LCD) or any other type of display, for displaying information to a computer user. The computer system includes input devices, such as a keyboard and a pointing device, for interacting with a computer user and providing information to the processor. Additionally, a touch screen could be employed in conjunction with display. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system, for driving a device or devices for implementing the invention, and for enabling the computer system to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media also may also take the form of acoustic or light waves, such as those generated during radio wave and infrared data communications.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system may receive the data on the telephone line and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device or either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication through one or more networks to other data devices. For example, the network link may provide a connection to another computer or remotely located presentation device through a local network (e.g., a LAN) or through equipment operated by a service provider, which provides communication services through a communications network. In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit and receive data, including program code, through the network(s) and, the network link and the communication interface. Moreover, the network link may provide a connection through a LAN to a mobile device such as a personal digital assistant (PDA) laptop computer, or cellular telephone. The LAN communications network and the communications network both use electrical, electromagnetic or optical signals that carry digital data streams. The signals through the various networks and the signals on the network link and through the communication interface, which carry the digital data to and from the system, are exemplary forms of carrier waves transporting the information. The processor system can transmit notifications and receive data, including program code, through the network (s), the network link and the communication interface.

Figure 23:
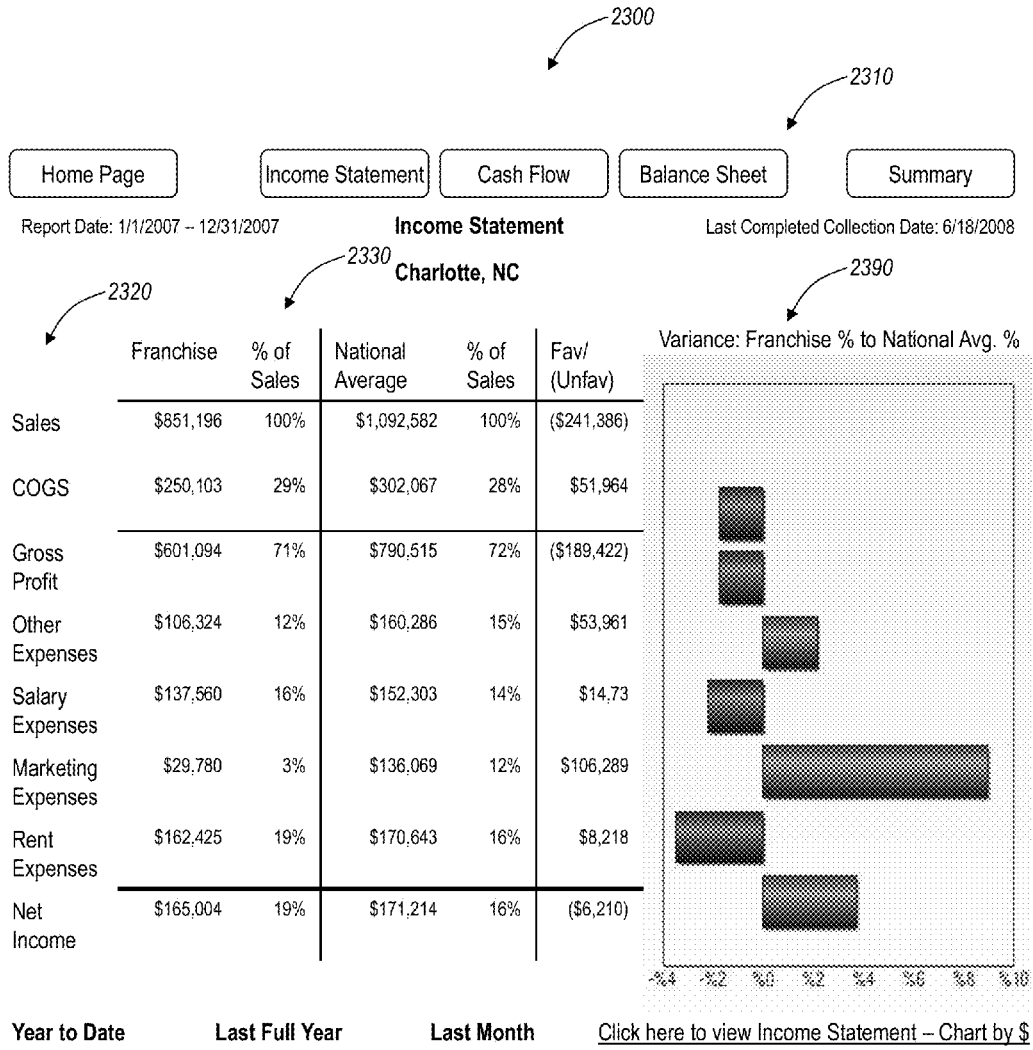
FIGS. 23-25 are GUI screens of profit and loss, cash flow, and a balance sheet.
Figure 24:
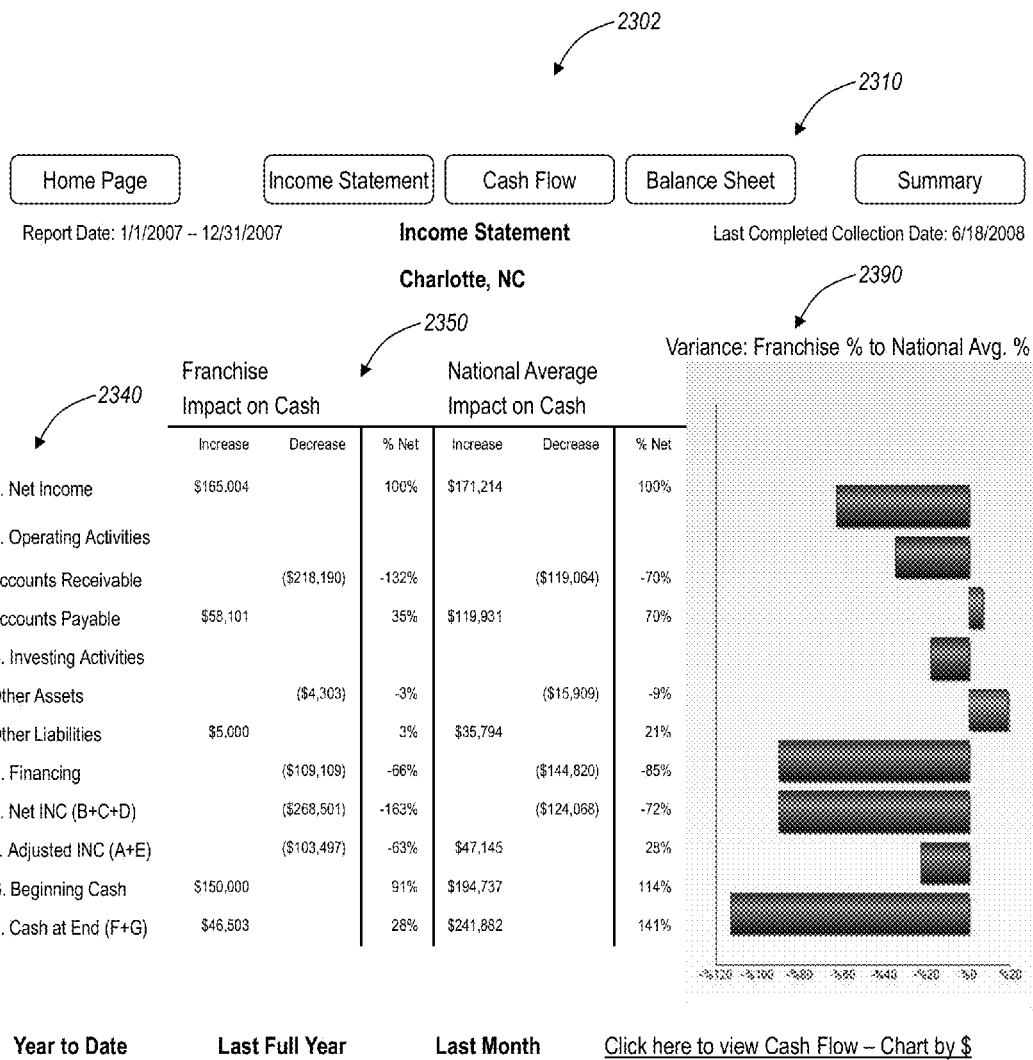
Figure 25:
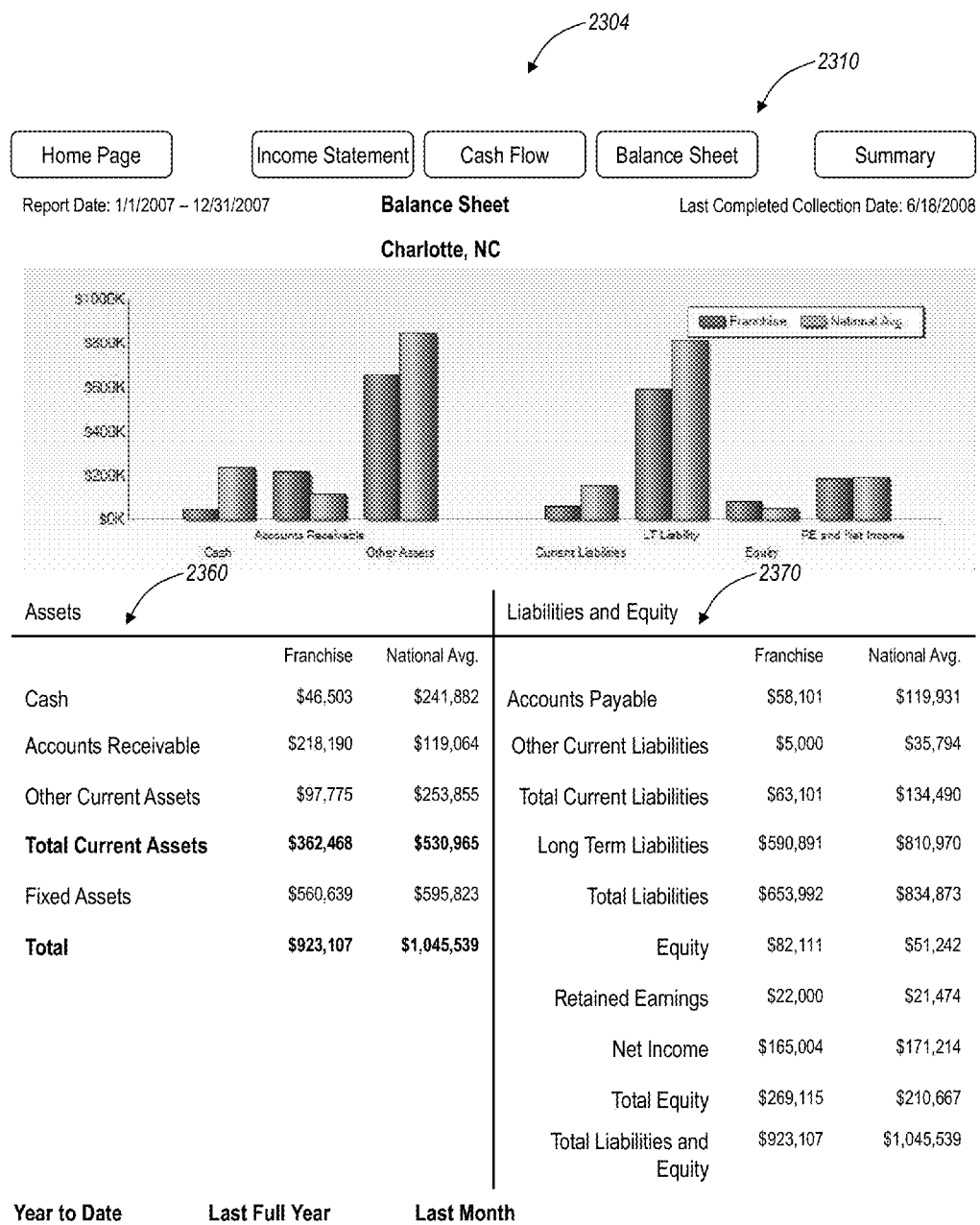

FIGS. 23-25 are graphical user interface (GUI) screen shots of profit and loss 2300, cash flow 2302, and a balance sheet 2304 according to an exemplary embodiment of the present invention. These screen shots 2300, 2302, 2304 can be created by and displayed on the computer 2200. Alternatively, these screen shots 2300, 2302, 2304 can displayed on a remote computer connected to the computer 2200. With the data collected through the remote data collection systems and methods described herein, the screen shots 2300, 2302, 2304 provide a visual mechanism to understand the data. For example, the screen shots 2300, 2302, 2304 are illustrated with respect to a franchise. One of the unique elements of the visual reporting system 226 of the present invention is the ability to create "visual cashflow" charts 2390 which enable a novice user to understand the impact of their LOB or operational data in a clear picture format (e.g. a favorable data value is a displayed in green and a bar pointing to the right, while a negative value is red and a bar pointing to the left). This novel and unique format allows those without expert level accounting, business or operational skills to understand the net results of their individual or consolidated business operations quickly and easily. Note that a design patent will be applied to this element of the report. Finally, those of ordinary skill in the art will recognize that the screen shots 2300, 2302, 2304 can be adapted to other business and to other types of collected data. Specifically, enhanced reports with greater business intelligence value or "insight" may be created by combining in one report data from both a financial or accounting package plus operational data from a LOB system. The types of reports that may be generated when both financial and operational data are consolidated and comparable under equal terms or measures are generally known as "dollar efficiency" measurements or metrics. Naturally a single remote data collection and consolidation system that can collect from both the financial and the LOB system with the same agent or code is an exemplary attribute of this invention.

Each of the screen shots 2300, 2302, 2304 include a plurality of icons 2310 enabling the user to navigate between the screen shots 2300, 2302, 2304 and to a home page or summary page. The screen shots 2300, 2302, 2304 further include a report date illustrating the range of dates from which the information is displayed, a title, and a last completed collection date. Note, the user can modify the date ranges and the type of information to display, such as through the home page. Additionally, each screen shot 2300, 2302, 2304 includes icons at the bottom to change the view to year-to-date, last full year, last month, and the like.

FIG. 23 illustrates and income statement or profit and loss report 2300 to enable a user to monitor a business's health. The profit and loss screen shot 2300 includes a list 2320 of various business attributes (e.g., sales, cost of goods sold (COGS), gross profit, etc.) and compares in a tabular format 2330 a particular entity (i.e., a franchise) to a category average (i.e., national sales averages of franchises or peer group sales average). This tabular format 2330 also shows the differences as favorable/unfavorable (Fav/Unfav) between the entity values and the selected comparison averages. Further, the graph 2390 displays a unique visual bar graph of the differences.

FIG. 24 illustrates cash flow 2302 to enable the user to understand various aspects associated with running the business. The cash flow screen shot 2302 includes a list 2340 of various business attributes (e.g., net income, accounts receivable, etc.) and compares in a tabular format 2350 a particular entity (i.e., a franchise) to an average (i.e., national averages of franchises or peer groups). Further, the graph 2390 displays a unique visual cash flow bar graph of the selected entities operating values. FIG. 25 illustrates a balance sheet 2304 to enable the user to provide peer comparisons of the entity to expectations. The balance sheet screen shot 2304 includes a list of assets 2360 and liabilities 2370 comparing them between the entity and the average.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A remote data collection system, comprising:
a network interface;
a connection to a data source;
a processor communicatively coupled to the network interface and the connection; and
memory storing instructions for remote data collection that, when executed, cause the processor to:
receive a request to extract data from the data source;
extract the data in a non-intrusive manner from the data source using a two phase process comprising a reconciliation phase and a collection phase; and
transmit one of an entire set and a subset of the extracted data based on the request.

2. The remote data collection system of claim 1, wherein the non-intrusive manner comprises the data source being read only to the processor during the remote data collection.

3. The remote data collection system of claim 1, wherein the instructions, when executed, further cause the processor to:
copy the data from the data source to a shadow database; and
process the data in the shadow database to provide the entire set and the subset of the extracted data.

4. The remote data collection system of claim 3, wherein the data source is read only to the processor during the remote data collection.

5. The remote data collection system of claim 3, wherein the shadow database is separate from the data source, and wherein the non-intrusive manner utilizes the shadow database for any insertions, updates, or deletions thereby preventing any interference, corruption, or modification of the data source by the processor during the remote data collection.

6. The remote data collection system of claim 3, wherein the instructions, when executed, further cause the processor to:
mark data stored in the shadow database with metadata to distinguish between existing data, modified data, deleted data, or new data, in order to facilitate the remote data collection process.

7. The remote data collection system of claim 3, wherein the instructions, when executed, further cause the processor to:
create the shadow database based on database schema, tables, and columns defined by the current collection object for the data source;
wherein the shadow database is adapted to a type associated with the data source thereby enabling the remote data collection to operate on a plurality of software, systems, and data files for obtaining extractable data therefrom.

8. The remote data collection system of claim 7, wherein the data source comprises one of a text file, a spreadsheet, a structured query language database, an Indexed Sequential Access Method file, and a flat file.

9. The remote data collection system of claim 7, wherein the instructions, when executed, further cause the processor to:
perform peer-to-peer ad hoc dynamic data replication and synchronization with a remote data system; and
utilize a dynamic command language with the remote data system to determine what data sets to retrieve, how to extract the data sets, and compare extracted data to targeted or requested data.

10. The remote data collection system of claim 1, wherein the instructions, when executed, further cause the processor to:
perform the reconciliation phase to determine what data to extract from the data source, to determine how to extract the data from the data source, and to define a current collection object for extracting the data from the data source; and
perform the collection phase to synchronize data between the data source and the shadow database, to process the data in the shadow database, and to send the processed data.

11. A remote data collection method, comprising:
receiving a request for remote data collection to extract data from a data source;
extracting the data in a non-intrusive manner from the data source using a two phase process comprising a reconciliation phase and a collection phase; and
transmitting one of an entire set and a subset of the extracted data based on the request.

12. The remote data collection method of claim 10, further comprising:
copying the data from the data source to a shadow database; and
processing the data in the shadow database to provide the entire set and the subset of the extracted data, wherein the data source is read only during the remote data collection.

13. The remote data collection method of claim 11, wherein the shadow database is separate from the data source, and wherein the non-intrusive manner utilizes the shadow database for any insertions, updates, or deletions thereby preventing any interference, corruption, or modification of the data source by the processor during the remote data collection.

14. The remote data collection method of claim 11, further comprising:
marking data stored in the shadow database with metadata to distinguish between existing data, modified data, deleted data, or new data, in order to facilitate the remote data collection process.

15. The remote data collection method of claim 11, further comprising:
creating the shadow database based on database schema, tables, and columns defined by the current collection object for the data source;
wherein the shadow database is adapted to a type associated with the data source thereby enabling the remote data collection to operate on a plurality of software, systems, and data files for obtaining extractable data therefrom.

16. The remote data collection method of claim 15, wherein the data source comprises one of a text file, a spreadsheet, a structured query language database, an Indexed Sequential Access Method file, and a flat file.

17. The remote data collection method of claim 15, further comprising:
performing peer-to-peer ad hoc dynamic data replication and synchronization with a remote data system; and
utilizing a dynamic command language with the remote data system to determine what data sets to retrieve, how to extract the data sets, and compare extracted data to targeted or requested data.

18. The remote data collection method of claim 10, further comprising:
performing the reconciliation phase to determine what data to extract from the data source, to determine how to extract the data from the data source, and to define a current collection object for extracting the data from the data source; and
performing the collection phase to synchronize data between the data source and the shadow database, to process the data in the shadow database, and to send the processed data.

19. Software stored in a non-transitory computer readable medium and comprising instructions executable by a system, and in response to such execution causes the system to perform operations comprising:
receiving a request for remote data collection to extract data from a data source;
interfacing to the data source in a read-only manner;
performing a reconciliation phase to determine what data to extract from the data source, to determine how to extract the data from the data source, and to define a current collection object for extracting the data from the data source;
performing a collection phase to synchronize data between the data source and a shadow database, to process the data in the shadow database, and to send the processed data; and
transmitting one of an entire set and a subset of the extracted data based on the request.

* * * * *